US010657709B2

United States Patent
Moore et al.

(10) Patent No.: US 10,657,709 B2
(45) Date of Patent: May 19, 2020

(54) GENERATION OF BODY MODELS AND MEASUREMENTS

(71) Applicant: Fit3D, Inc., Redwood City, CA (US)

(72) Inventors: Greg A. Moore, San Mateo, CA (US); Tyler H. Carter, Palo Alto, CA (US)

(73) Assignee: Fit3D, Inc., Redwood City, CA (US)

( * ) Notice: Subject to any disclaimer, the term of this patent is extended or adjusted under 35 U.S.C. 154(b) by 0 days.

(21) Appl. No.: 16/168,750

(22) Filed: Oct. 23, 2018

(65) Prior Publication Data
US 2019/0122424 A1   Apr. 25, 2019

Related U.S. Application Data

(60) Provisional application No. 62/576,024, filed on Oct. 23, 2017, provisional application No. 62/633,014, filed on Feb. 20, 2018.

(51) Int. Cl.
*G06T 17/00* (2006.01)
*G06T 7/60* (2017.01)
(Continued)

(52) U.S. Cl.
CPC ............. *G06T 17/00* (2013.01); *G06N 7/00* (2013.01); *G06Q 30/0631* (2013.01); *G06T 7/50* (2017.01); *G06T 7/60* (2013.01)

(58) Field of Classification Search
CPC .. G06T 17/00; G06T 7/50; G06T 7/60; G06N 7/00
See application file for complete search history.

(56) References Cited

U.S. PATENT DOCUMENTS 7,253,766 B2   8/2007   Foote et al.
7,702,380 B1 *  4/2010  Dean ................... G06T 17/00
                                                  600/426
(Continued)

FOREIGN PATENT DOCUMENTS

CN   102551685    4/2015
JP     5732775    6/2015
(Continued)

OTHER PUBLICATIONS

Theobalt, C., Carranza, J., & Magnor, M. A. (Oct. 2003). Enhancing silhouette-based human motion capture with 3D motion fields. In 11th Pacific Conference onComputer Graphics and Applications, 2003. Proceedings. (pp. 185-193). IEEE.*
(Continued)

*Primary Examiner* — Sarah Lhymn
(74) *Attorney, Agent, or Firm* — Thorpe North & Western

(57) ABSTRACT

Measurements or models of a human body are generated. An image of the human body may be identified and a fiducial map may be generated. The fiducial map may be compared to pre-processed fiducial maps stored in a data store. A plurality of pre-processed fiducial maps of human bodies may be identified when a correlation between the fiducial map and the pre-processed fiducial maps exceeds a defined threshold. A silhouette image of the human body may be generated based on the image and may be compared to pre-processed silhouette images associated with the plurality of pre-processed fiducial maps. One of the pre-processed silhouette images may be identified when a correlation value between the silhouette image and the pre-processed silhouette images exceeds a defined threshold. Measurements or a model of the human body may be identified based on the one of the pre-processed silhouette images.

19 Claims, 30 Drawing Sheets

(51) Int. Cl.
    *G06Q 30/06*         (2012.01)
    *G06N 7/00*          (2006.01)
    *G06T 7/50*          (2017.01)

(56) References Cited

U.S. PATENT DOCUMENTS

| | | | |
|---|---|---|---|
| 8,823,775 | B2 | 9/2014 | Xu et al. |
| 9,984,588 | B1* | 5/2018 | Barker ............... G09B 19/0092 |
| 2004/0083142 | A1 | 4/2004 | Kozzinn |
| 2005/0031194 | A1* | 2/2005 | Lee ................. G06K 9/00288 |
| | | | 382/154 |
| 2006/0171590 | A1* | 8/2006 | Lu ................... G06K 9/00201 |
| | | | 382/190 |
| 2007/0098250 | A1 | 5/2007 | Molgaard et al. |
| 2007/0126733 | A1 | 6/2007 | Yang et al. |
| 2010/0020073 | A1* | 1/2010 | Corazza ............... G06T 13/40 |
| | | | 345/420 |
| 2010/0111370 | A1* | 5/2010 | Black ................ G06K 9/00369 |
| | | | 382/111 |
| 2010/0191124 | A1* | 7/2010 | Prokoski ............. A61B 5/0064 |
| | | | 600/473 |
| 2010/0277571 | A1 | 11/2010 | Xu et al. |
| 2011/0298897 | A1 | 12/2011 | Srareen et al. |
| 2011/0306468 | A1 | 12/2011 | Wilson et al. |
| 2012/0086783 | A1 | 4/2012 | Srareen |
| 2012/0172681 | A1 | 7/2012 | Sun et al. |
| 2012/0179026 | A1* | 7/2012 | Simon ................. A61B 90/36 |
| | | | 600/411 |
| 2013/0127847 | A1* | 5/2013 | Jin ..................... G06T 17/20 |
| | | | 345/420 |
| 2013/0137942 | A1 | 5/2013 | Karo et al. |
| 2013/0249908 | A1* | 9/2013 | Black ................... G06T 17/00 |
| | | | 345/420 |
| 2013/0261470 | A1 | 10/2013 | Allison et al. |
| 2013/0315475 | A1* | 11/2013 | Song ................. G06K 9/00369 |
| | | | 382/154 |
| 2014/0348417 | A1* | 11/2014 | Moore ................. A61B 5/1075 |
| | | | 382/154 |
| 2016/0078663 | A1 | 3/2016 | Srareen |
| 2016/0088284 | A1 | 3/2016 | Srareen |
| 2016/0247017 | A1 | 8/2016 | Srareen |
| 2017/0169577 | A1* | 6/2017 | Accomando ............. G06T 7/33 |
| 2017/0273639 | A1* | 9/2017 | Iscoe ................. G06F 3/04815 |
| 2018/0144237 | A1* | 5/2018 | Sareen ................. G06N 3/006 |

FOREIGN PATENT DOCUMENTS

| | | |
|---|---|---|
| KR | 10-0722229 | 5/2007 |
| WO | WO 2012/079014 | 6/2012 |

OTHER PUBLICATIONS

Mulayim, A. Y., Yilmaz, U., & Atalay, V. (2003). Silhouette-based 3-D model reconstruction from multiple images. IEEE Transactions on Systems, Man, and Cybernetics, Part B (Cybernetics), 33(4), 582-591.*

Jing Tong et al., "Scanning 3D Full Human Bodies Using Kinects", Apr. 2012, IEEE Transactions on Visualization and Computer Graphics, vol. 18, No. 4, pp. 643-650.

Alexander Weiss et al. "Home 3D Body Scans from Noisy Image and Range Data", 2011, In 13th International Conference on Computer Vision, pp. 1951-1958.

Hyewon Seo et al., "An Automatic Modeling of Human Bodies from Sizing Parameters", 2003, Association for Computer Machinery, Inc., pp. 19-26 and 234.

* cited by examiner

| Length Name | Width Name | Metadata Name |
|---|---|---|
| Head to Shoulder Center | Neck Width | Height |
| Right/Left Shoulder to Shoulder Center | Chest Width | Weight |
| Right/Left Shoulder to Right/Left Elbow | Waist Width | Gender |
| Right/Left Elbow to Right/Left Wrist | Hip Width | Ethnicity |
| Shoulder Center to Hip Center | Right/Left Bicep Width | Age |
| Right/Left Hip to Hip Center | Right/Left Forearm Width | ... |
| Right/Left Hip to Right/Left Knee | Right/Left Thigh Width | |
| Right/Left Knee to Right/Left Ankle | Right/Left Calf Width | |
| ... | ... | |

GENERATION OF BODY MODELS AND MEASUREMENTS

RELATED APPLICATIONS

This application claims the benefit of U.S. Provisional Application No. 62/576,024, filed on Oct. 23, 2017, and of U.S. Provisional Application No. 62/633,014, filed on Feb. 20, 2018, the entire contents of each of which are incorporated herein by reference.

BACKGROUND

Three-dimensional (3D) body scanners are designed to capture a 3D model (or 3D avatar) of a user's body. The 3D model may be used to visualize an accurate shape of the user's body. Generally, 3D body scanners may include one or more cameras that capture images of the user's body from multiple angles. From the images, the 3D body scanner may reconstruct the user's body in three dimensions and generate the 3D model of the user's body.

In one example, 3D body scanners may be used for a number of applications. For example, 3D models and resulting body measurements may be used for 3D printed figurines, fitness and personal health tracking, healthcare and medical evaluations, clothing fit recommendations, draping clothing atop models to validate fit, evaluating and providing insights into sizing strategies for apparel companies, etc. For example, 3D body scanners may be used in fitness clubs and healthcare facilities to allow users to view body shape, posture and health indicators. As another example, 3D body scanners may be used to monitor body shape and posture during pregnancy or to capture amputated limbs in three dimensions to make custom 3D printed prosthetics. As another example, 3D body scanners may be used in apparel and retail to recommend or ensure proper fitting clothing.

In one example, 3D body scanning systems may be implemented using a body scanning booth or cabin, which may be fitted with cameras or 3D body scanners. The user may stand within the booth or cabin and hold a pose for a certain period of time (e.g., 20 seconds), which allows the cameras or 3D body scanners to capture images of the user from multiple angles. The 3D body scanning system may include a software application that reconstructs the 3D model of the user's body by 'stitching' together the images to generate a detailed 3D model, which may have colors and textures depending on a type of 3D body scanning system used. In another example, 3D body scanning systems may include a rotating table or platform on which the user stands and faces a fixed camera or 3D body scanner, which allows the user to be captured from multiple angles.

BRIEF DESCRIPTION OF THE DRAWINGS

FIG. 12 is a table that includes joint and body landmark information extracted from a 3D body model and metadata received from a user via a user interface according to an example of the present technology.

FIG. 21 illustrates a configurable user interface that enables a user to provide known demographic information, select from a set of body segments, select a clothing fit preference and receive recommendations for an appropriate clothing size according to an example of the present technology.

DETAILED DESCRIPTION

Figure 1A:
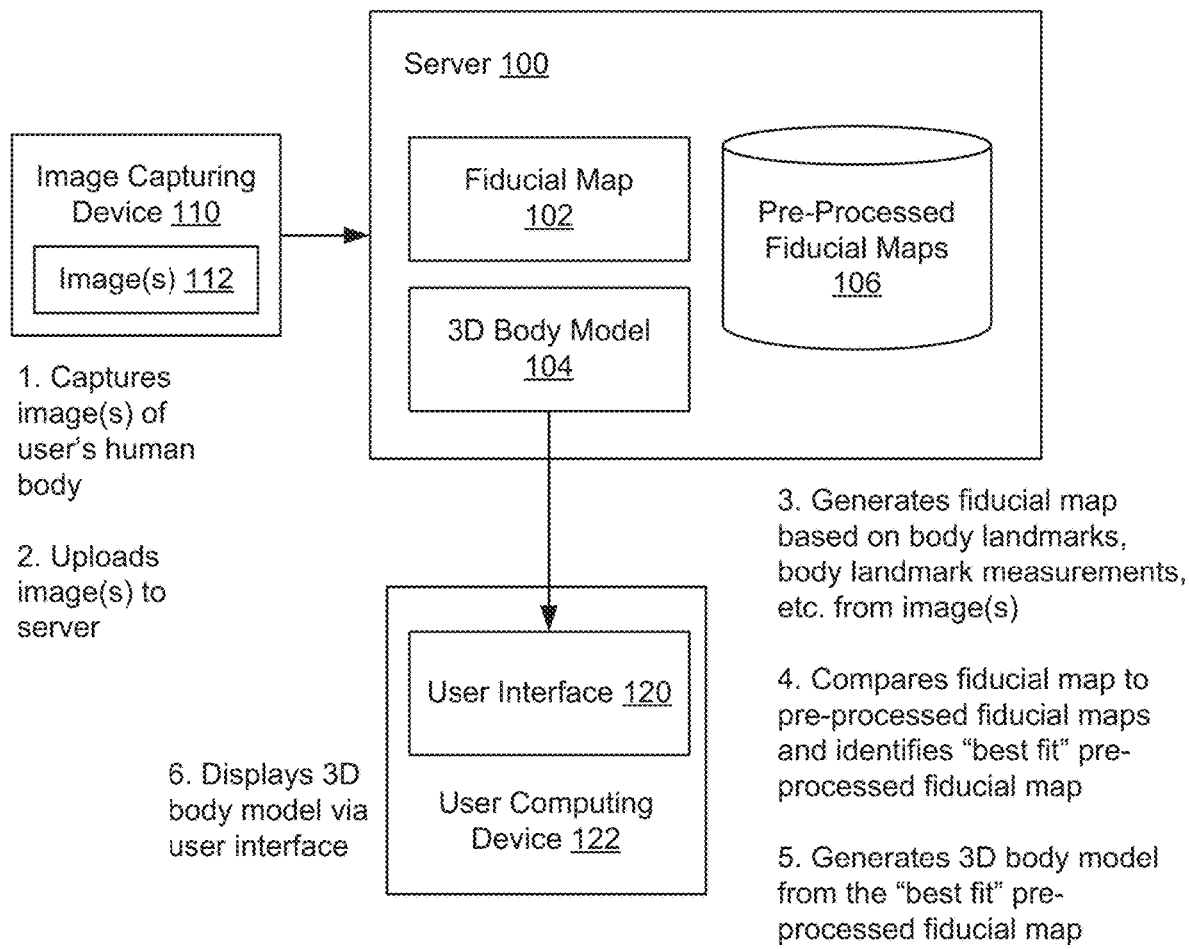
FIGS. 1A, 1B and 1C illustrate a system and related operations for generating a three-dimensional (3D) body model of a human body and providing a user interface that displays the 3D body model according to an example of the present technology.

While 3D body scanning systems accomplish many of the aforementioned activities, they inherently do not scale. Therefore, to provide the same value of services as provided through 3D body scanners, this technology utilizes already captured 3D body scan data to predict 3D body models and measurements. For example, the present technology may use one or more of the following inputs: (1) one or more images of a human body, (2) user inputs, which may include a set of image selections, (3) other 3D body scanners, or (4) a set of manually inputted measurements.

A technology is described for estimating body measurements, body shape and/or constructing a three-dimensional (3D) statistically relevant model (or avatar) of a user's body in accordance with the estimated body measurements and body shape. In one configuration, a 3D body model may be constructed using a survey whereby the user selects one or more representative bodies or images in an attempt to match his or her own body shape. This user selection of a represent body or image may be in conjunction with one or more images captured of the user from one or more cameras, which may include depth camera images or depth information, or the user selection may not involve any images of the user. This user selection of a represent body or image may also be in conjunction with one or more manually captured measurements from the user, which the user may input manually. The images may be used as an input along with user metadata to estimate a fiducial map that corresponds to the user's body. A 'best fit' or a best match may be found between the user's fiducial map to existing pre-processed fiducial maps generated from a 3D body model data store. After the 'best fit' pre-processed fiducial map is identified from the existing pre-processed fiducial maps, the 'best fit' pre-processed fiducial map may be used to estimate the user's body shape and body measurements and to construct a 3D statistically relevant model or avatar of the user's body, as defined by the inputs (e.g., the selected images and the user metadata).

In an alternative configuration, the 3D body model may be constructed using one or more images captured from one or more cameras of a user (e.g., personal camera, smartphone, webcam, etc.). In this configuration, the user may capture and upload the images, as opposed to selecting images that are similar to the user's own body shape. A fiducial map may be generated based on the image and the fiducial map may be compared to existing pre-processed fiducial maps to identify a 'best fit' pre-processed fiducial map, as described above. Therefore, in this configuration, users or individuals would be enabled to accurately estimate body measurements and generate a 3D body model from camera images from an electronic device, which may include one or more cameras.

In a more specific example, one or more of the following inputs may be used to generate the 3D body model: (i) a survey whereby the user selects one or more representative bodies or images in an attempt to match his or her own body shape, (ii) one or more images of a human body using one or more cameras in one or more configurations, (iii) height, weight, age, gender, and/or other known information, (iv) known or estimated body measurements, (v) clothing measurements with information about preferred fit, (vi) or any other input that is meant to estimate information associated with the human body or user's demographics. Based on one or more of these inputs, body measurements for the user may be estimated and a statistically relevant 3D body model of the user's human body may be built, which may be used for a variety of purposes.

In one example, after the inputs are inserted by the user or images are captured of the human body (of the user), joint positions and body landmarks on the user's body may be estimated using the inputs and/or images, and silhouette images may be extracted from the images. Extracted body information from the joint positions, body landmarks and/or silhouette images may be regressed to find a best fit from a 3D body model data store. For example, a fiducial map of the user image, including the joint structure and body landmarks, may be compared to a fiducial map of models in the 3D body model data store. A number of models approximating the fiducial map of the user image may be identified when fiducial maps of the models are sufficiently similar to the fiducial map of the user image (e.g., above a predefined threshold percentage of similarity). The silhouette image of the user may then be compared against silhouette images of the models having the similar fiducial map to identify a silhouette image which closely approximates or is sufficiently similar to the silhouette image of the user (e.g., above a predefined threshold percentage of similarity). The model from the 3D body model data store most closely fitting both the fiducial map and the silhouette image may be a best fit. In some examples, a best fit may be a modification of the closest 3D body model with modifications made to more closely fit the fiducial map and silhouette of the user image. The modification may use machine learning to modify the closest 3D body model to more closely fit the user image. After the best fit is procured, the user associated with the inputs and/or images may receive an estimate of their body measurements and a statistically relevant 3D body model of his or her body.

In one example, the joint positions and body landmarks, 3D body model, estimated body measurements and estimated body shape may be stored on a server and may be recalled through a configurable user interface. By storing this data, a user may later review data, such as to compare changes in body measurements over time. Where the user is selecting one or more images of other people with a body shape similar to the user's body shape, storing the data including the landmarks, model, measurements, etc. may enable re-use of the image for selection by another user without re-calculation of the data. Other statistics such as wellness information like body shape scoring, body composition, etc., may be calculated as well as shared with other locations where the user will be able to use the body measurements and statistically relevant 3D body model to enhance and personalize the user's shopping experiences.

In one example, the construction or generation of 3D body models based on images for users may support a number of applications in body scanning, health and wellness assessments, health and wellness tracking, as well as fashion, product, and apparel design, management, and commerce, including e-commerce. In addition, the 3D body models may be used by the user to import information useful to define clothing preference and to suggest appropriate clothing or appropriate sizes of clothing that will best fit the user.

In one example, based on the 3D body model, estimated body measurements and/or the estimated body shape, the user may evaluate and track his or her data for health and wellness risks, shop for clothing using accurately estimated body measurements, choose products and services built specifically for the user's body, or take advantage of other customized products and services in an otherwise non-customized environment.

In the past, 3D body models have been captured using a range of expensive devices utilizing white-light, millimeter waves, infrared light, and hundreds to thousands of pictures (photogrammetry) in multiple configurations to include booths, rotating platforms, rotating cameras, sliding cameras, etc. In the past, body measurements and 3D body models have been very expensive to capture due to the cost of the system, also known as body scanners, required to accurately capture and construct 3D body models and extract measurements. Further, in the past, camera technology has been disjointed from processing power and seldom included the necessary information to accurately estimate body measurements and construct 3D body images, which meant that cameras needed to be a part of larger and more complicated systems to accurately capture the data needed to estimate body measurements and construct 3D body images. Further, in the past, there have not been body measurement datasets and/or 3D body model datasets, with sufficient depth and breadth, which would allow an accurate estimation of body measurements or 3D body models for a diverse population.

Thus, it would be desirable and advantageous to address these shortcomings by developing models that allow for individuals to simply capture one or more images using a device with one or more cameras or to select images that are similar to the user's own body type, and to accurately estimate the individual's body measurements as well as generate a 3D body model based on the captured/selected images.

FIG. 1A illustrates an exemplary system and related operations for generating a three-dimensional (3D) body model 104 of a user's human body at a server 100 and providing a user interface 120 to a user computing device 122 that displays the 3D body model 104. The server 100 may be included in a service provider environment (such as a cloud environment). The server 100 may include module(s) and data store(s) that are used to generate the 3D body model 104 of the user's body. In the configuration shown in FIG. 1A, image(s) 112 may be a source of input for generating the 3D body model 104.

In a first action, an image capturing device 110 (e.g., a computing device with a camera) may capture image(s) 112 of the user's body. The images 112 may be captured from one or more angles. For example, the user and/or the image capturing device 110 may move in order to capture multiple images of the user at multiple angles. The images 112 may be two-dimensional (2D) images and/or 3D images.

In a second action, the image capturing device 110 may transmit or upload the images 112 to the server 100. The image capturing device 110 may send the images 112 to the server 100 over a suitable wireless and/or wired network.

In one configuration, the image capturing device 110 and the user computing device 122 may be combined to form a single computing device. In other words, the single computing device may include an image capturing mechanism (e.g., a camera) that captures and uploads the images 112 to the server 100, as well as a display to show the user interface 120.

In a third action, the server 100 may receive the images 112 of the user's body from the image capturing device 110. Based on the images 112 (e.g., 2D or 3D images), the server 100 may build a fiducial map 102 by mapping joint structures onto the captured images 112 of the user's body. More specifically, the server 100 may detect pixel locations of body landmarks on the images 112, which may be performed using commercially available libraries. For 2D images of the user's body, a background filter may be applied to an image 112 to extract a body from the image 112, and body landmarks may be detected from the image 112 using various libraries, such as DLib Shape Predictor, OpenCV, CMU OpenPose, etc. For 3D images of the user's body, body landmarks may be detected using various libraries, such as PCL People, Kinect Skeleton, Orbbec Body Tracking, Kite, etc.

The server 100 may translate body landmark pixel locations to 3D coordinates using various techniques, depending on whether the images 112 of the user's body are in 2D or 3D. For 2D images of the user's body, known input parameters may be used to determine the 3D coordinates, including camera and lens registration parameters, image background, and user metadata combined with geometry concepts (e.g. cross ratio) and computer vision techniques to translate the a screen space (u,v) to 3D world space (x,y,z) coordinates. For 3D images of the user's body, computer vision techniques may be used to translate 2D pixel locations to 3D coordinates. Then, the server 100 may calculate pose and relative body landmark measurements from the body landmarks, which may be performed using a combination of computer vision techniques and mathematical mechanisms. Based on the body landmarks, pose and relative body landmark measurements, etc., the server 100 may map the joint structures to the captured images 112 of the user's body to build the fiducial map 102 of the user's body.

In one example, the fiducial map 102 may be defined based on the body landmarks, relative body landmark measurements, pose information, user metadata and segmented curvatures. The body landmarks may be 2D/3D coordinates of human body joints, e.g., left elbow, base of spine, neck, etc. and 2D/3D points along a surface of a body. The relative body landmark measurements may be used to create a body landmark profile, and may be distances and/or angles derived from the body landmarks. For example, the relative body landmark measurements may include a distance from wrist to elbow, left knee to right knee, a width at smallest point of body torso, and an angle created by points left shoulder, left elbow, left wrist, etc. The pose information may indicate an orientation of body segments, e.g., a body in a certain pose may be standing up straight with arms and legs extended fully and separated from body. The user metadata may include information received from the user, such as height, weight, age, and gender. The segmented curvatures may be a spline of points along a surface of the body that is divided into segments by the body landmarks. One example of a curvature segment is an arc of a stomach between an underbust and waist.

In a fourth action, the server 100 may compare the fiducial map 102 (also referred to as an input fiducial map) to a plurality of pre-processed fiducial maps 106 that are stored at the server 100 or are accessible to the server 100. Based on the comparison, the server 100 may identify a 'best fit' pre-processed fiducial map 106 that best matches the fiducial map 102 (or input fiducial map). The 'best fit' pre-processed fiducial map 106 may have a highest correlation value as compared to other pre-processed fiducial maps 106 in relation to the fiducial map 102, or a correlation value that exceeds a defined threshold. Each of the pre-processed fiducial maps 106 may have a corresponding 3D body model 104.

More specifically, the fiducial map 102 (or input fiducial map) may be compared to the plurality of pre-processed fiducial maps 106 to identify the 'best fit' pre-processed fiducial map 106 using various data science techniques. Initially, data may be pre-processed using common statistical techniques to detect outliers and account for missing data. The pre-processed data may be used to determine which of the pre-processed fiducial maps 106 have the 'best fit' to the fiducial map 102 (or input fiducial map). The best fit process may be accomplished by correlating the fiducial map 102 (or input fiducial map) with the pre-processed fiducial maps 106 using a combination of data science techniques, which may include statistical models (e.g., regression), machine learning models (e.g., random forest), principal component analysis, neural networks, as well as other artificial intelligence (AI) applications.

In one example, the best fit process may use principal component analysis to build a representation framework for the fiducial map 102 and the pre-processed fiducial maps 106. After the fiducial map 102 and the pre-processed fiducial maps 106 have been processed to the representation framework using the principal component analysis, a nearest neighbor matching (NN) or similar technique may be used to determine a correlation value for the fiducial map 102 (or input fiducial map) to each of the pre-processed fiducial maps 106. The representation framework may reduce a number of features from the fiducial map 102 to a set of simplified features ordered in importance by their description of the overall variance in the model. For example, a first feature may describe an overall size of a person, and therefore a pre-processed fiducial map 106 from a small and large person may have little correlation in the representation framework. The representation framework outputs may be provided to a k-dimensional (KD) algorithm, which may split the data for each attribute based on median and create a tree based on this split. Once the trees have been created, the best fit for the fiducial map 102 (or input fiducial map) may be determined by the region in which the input falls, and the closest neighbor may be determined based on a metric such as Euclidean distance.

In one example, the best fit process may be accomplished using alternative mechanisms. For example, other nearest neighbor algorithms may be used, such as a K-Neighbors classifier or k-nearest neighbors algorithm (k-NN). Clustering algorithms such as K-means, centroid based clustering, etc. can be used to cluster fiducial maps in an unsupervised manner. In this case, the fiducial map 102 (or input fiducial map) may be used to match a pre-processed fiducial map cluster, and a best fit pre-processed fiducial map may be composed of the average sample in the region.

In a fifth action, the server 100 may determine the 3D body model 104 that corresponds with the 'best fit' pre-processed fiducial map 106, which may also be referred to as a matched 3D body model 104. As previously explained, each of the pre-processed fiducial maps 106 may have a corresponding 3D body model 104, and vice versa. Therefore, fiducial maps may be used as a common format for matching data about the user's body collected by the server (i.e., the fiducial map 102, or input fiducial map) with pre-processed fiducial maps 106 that correspond to existing 3D body models 104. In one example, when multiple matched 3D body models 104 are determined, the multiple matched 3D body models 104 may be combined to produce a single set of results.

In a sixth action, the server 100 may send the matched 3D body model 104 to the user computing device 122. The user computing device 122 may display the matched 3D body model 104 via the user interface 120. The user may view the matched 3D body model 104 via the user interface 120 of the user computing device 122. In addition, the server 100 may send corresponding body information along with the matched 3D body model 104, such as an estimated body shape, estimated body measurements, etc. The 3D body model 104, the estimated body shape and the estimated body measurements will correlate with the user's real-world body measurements and real-world body shape, thereby providing the user with an accurate visualization of their own body measurements and body shape.

Figure 1B:
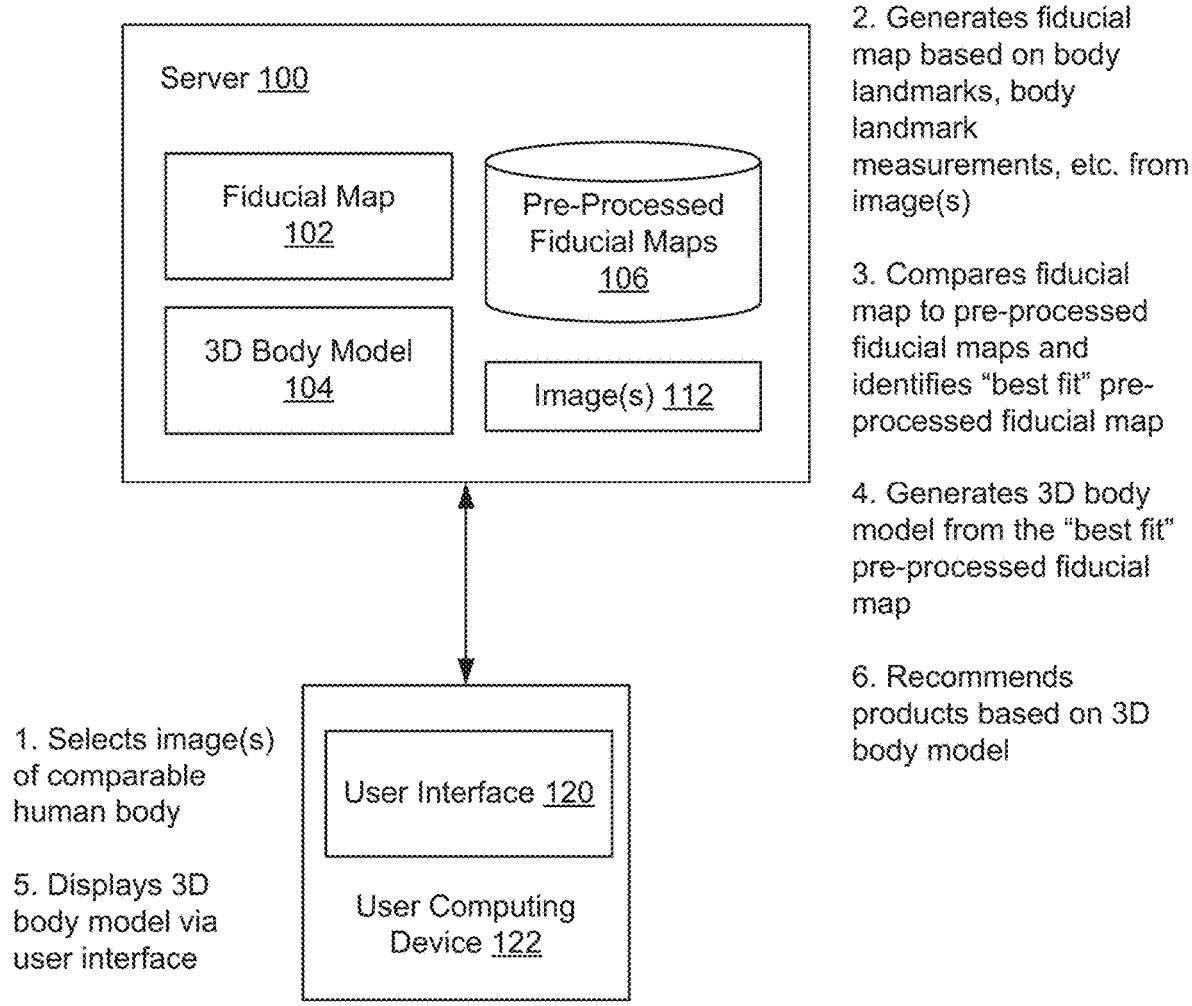

FIG. 1B illustrates an exemplary system and related operations for generating a three-dimensional (3D) body model 104 of a user's human body at a server 100 and providing a user interface 120 to a user computing device 122 that displays the 3D body model 104. The server 100 may be included in a service provider environment (such as a cloud environment). In the configuration shown in FIG. 1B, user selection of image(s) 112 may be a source of input for generating the 3D body model 104.

In a first action, the server 100 may provide a plurality of images 112 to the user computing device 122 for display via the user interface 120. The plurality of images 112 may correspond to a plurality of distinct body types. For example, the images 112 may correspond to a skinny body type, an overweight body type, a tall body type, a short body type, etc. The user may be able to specify certain criteria to filter the images 112 that are displayed via the user interface 120. The server 100 may receive, via the user interface 120, a selection of image(s) 112 from the plurality of images 112. For example, the selected image 112 may correspond to a particular body type of the user.

In one configuration, the user interface 120 may be accessible to the user via an application that executes on the user computing device 122, or a web or mobile application or web browser, which may connect to a web API.

In one example, the user computing device 122 may provide a number of user inputs, such as known information about the user, which may include height, weight, age, gender, body measurements, ethnicity, nationality, clothing fit preference, disposable income, etc. Based on the user inputs, the server 100 may filter the images 112 accordingly and only provide the most relevant images 112 to the user computing device 122. The images 112 that are displayed via the user interface 120 may be human body segments, drawings of human bodies, or other graphical selections. The user may be prompted to select the images 112 that best represent his or her or a subject's body. This process may be repeated several times with one or more images 112. Each of the selections shown to the user may represent a set of body measurements and each user selection may be recorded in accord with a represented set of body measurements.

In a second action, the server 100 may identify the selected images 112 and build the fiducial map 102 based on the selected images 112. The server 100 may build the fiducial map 102 based on body landmarks, body landmark measurements, etc. identified from the selected images 112. In a third action, the server 100 may compare the fiducial map 102 (or input fiducial map) to a plurality of pre-processed fiducial maps 106, and based on the comparison, the server 100 may identify a 'best fit' pre-processed fiducial map 106 that best matches the fiducial map 102 (or input fiducial map). In a fourth action, the server 100 may determine the 3D body model 104 that corresponds with the 'best fit' pre-processed fiducial map 106. In a fifth action, the server 100 may send a matched 3D body model 104 to the user computing device 122 for display via the user interface 120.

Therefore, similar to the mapping mechanism described earlier, the user selections may be merged together to identify a correlation between the user selections in association with the user inputs. This aggregated information may be used to identify one or more 3D body models and body measurements that are represented by the user selections. From these matched 3D body models, a 3D body model that matches the input selections and the user's body measurements may be predicted.

In a sixth action, the server 100 may identify one or more products for sale that are targeted for a body type of the user based on the 'best fit' pre-processed fiducial map 106 (and corresponding 3D body model 104). For example, the products may include clothing having a size that is targeted for the body type of the user based on the 'best fit' pre-processed fiducial map 106 (and corresponding 3D body model 104). In other words, the 'best fit' pre-processed fiducial map 106 and corresponding 3D body model 104 may indicate predicted measurements of the user. The server 100 may identify clothing recommendations based on the predicted measurements of the user. The server 100 may send a listing of recommended clothing items for sale to the user computing device 122 for display via the user interface 120. The user computing device 122 may display the listing of recommended clothing items along with the predicted measurements of the user.

In one example, the server 100 may use the predicted measurements (or real measurements) to recommend clothing or clothing sizes based on clothing fit, as a designer intended or as the user prefers based on his or her fit preference. In another example, the user or business may input clothing specifications such as clothing images, measurements, materials, easements, tolerances, sizes, and other information to represent clothing into a data store associated with the server 100. The information may be manually inserted into the data store, imported from a file known as a technical pack, imported from a user's product lifecycle management system, or by another mechanism.

In one example, the server 100 may send information about recommended products that are targeted for a specific body type of a user to an electronic retail store. The electronic retail store may display the information on an electronic page associated with the electronic retail store. In other words, other entities may utilize the server's capability of generating the 3D body model 104 and identifying recommended products based on the 3D body model.

Figure 1C:
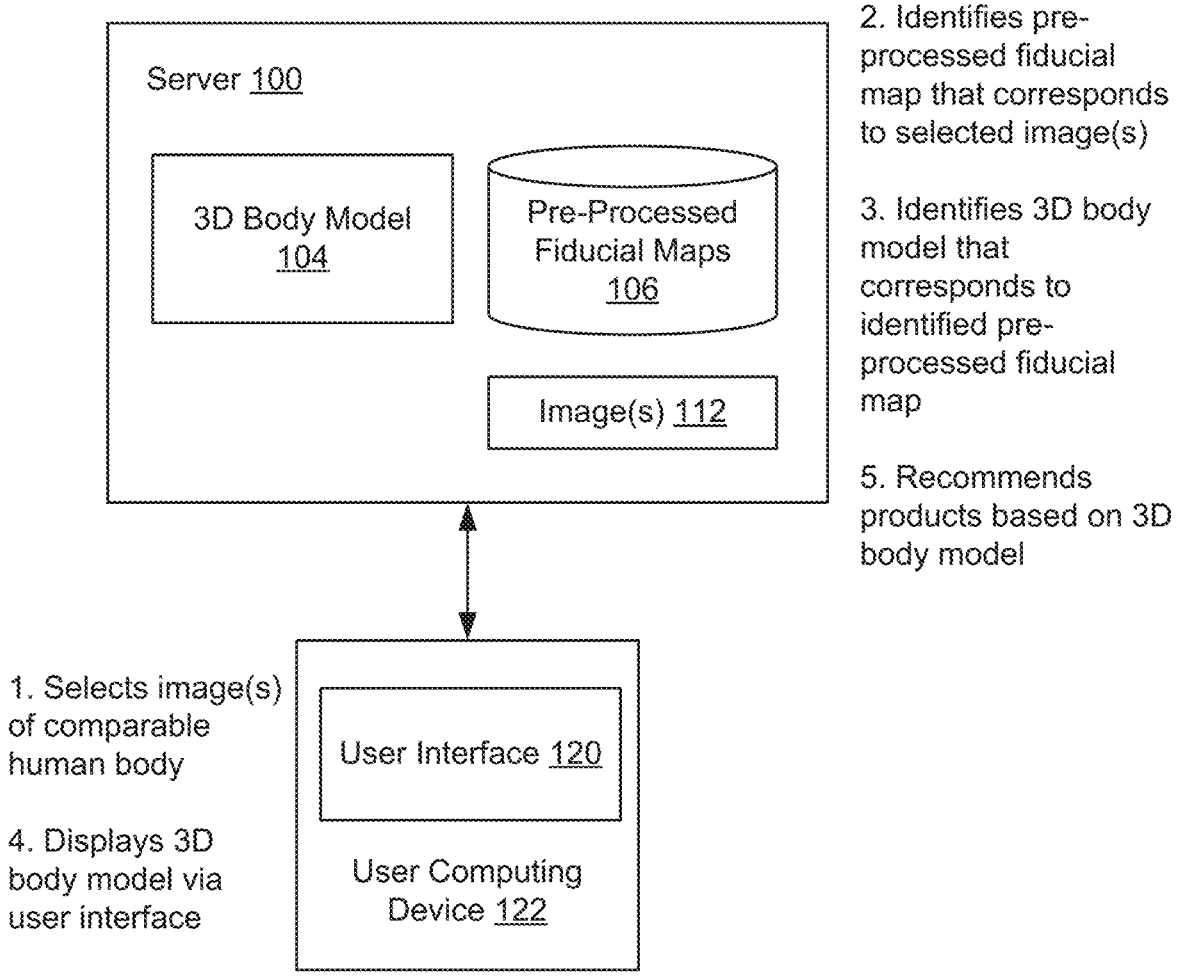

FIG. 1C illustrates an exemplary system and related operations for generating a three-dimensional (3D) body model 104 of a user's human body at a server 100 and providing a user interface 120 to a user computing device 122 that displays the 3D body model 104. The server 100 may be included in a service provider environment (such as a cloud environment). In the configuration shown in FIG. 1C, user selection of image(s) 112 may be a source of input for generating the 3D body model 104.

In a first action, the server 100 may provide a plurality of images 112 to the user computing device 122 for display via the user interface 120. The plurality of images 112 may correspond to a plurality of distinct body types. The server 100 may receive, via the user interface 120, a selection of image(s) 112 from the plurality of images 112. In a second action, the server 100 may identify a pre-processed fiducial map 106 that corresponds to the selected image 112. In other words, each of the images 112 may already be associated with a pre-processed fiducial map 106. In a third action, the server 100 may identify the 3D body model 104 that corresponds to the identified pre-processed fiducial map 106. In other words, each of the pre-processed fiducial maps 106 may already be associated with a given 3D body model 104. In a fourth action, the server 100 may send the 3D body model 104 to the user computing device 122 for display via the user interface 120. In a fifth action, the server 100 may identify recommended products for sale based on the 3D body model 104, and the server 100 may send a listing of the recommended products for sale to the user computing device 122.

Figure 2:
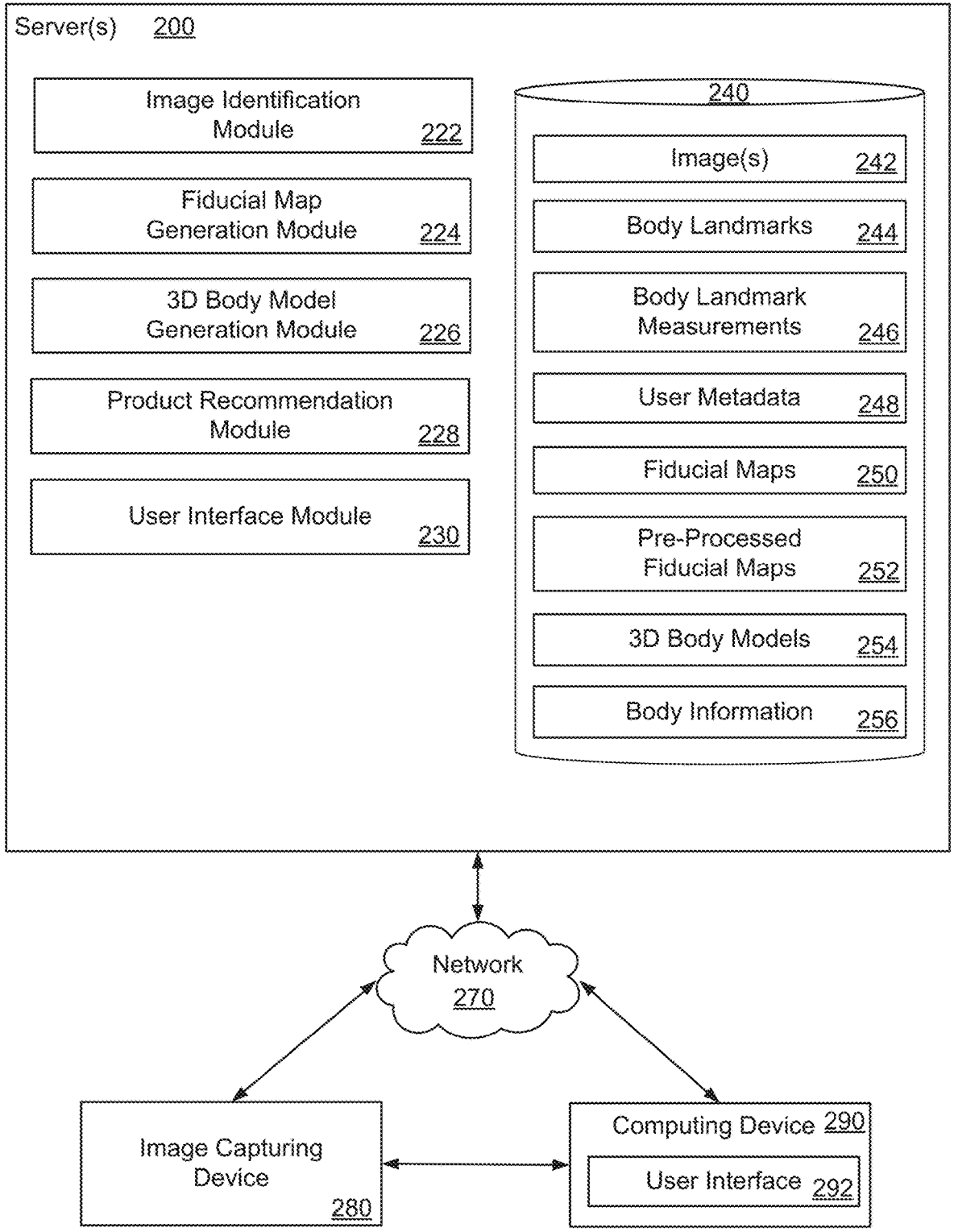
FIG. 2 is an illustration of a networked system for providing a user interface that displays a 3D body model and/or products for sale based on the 3D body model according to an example of the present technology.

FIG. 2 illustrates components of a server 200 according to one example of the present technology. The server 200 may contain a data store 240 and a number of modules for generating a three-dimensional (3D) body model 254 of a human body and providing a user interface 292 that displays the 3D body model 254. The server 200 may receive images 242 via an image capturing device 280 over a network 270. The server 200 may process the images 242 and generate the 3D body model 254 based on the images 242. The server 200 may transmit the 3D body model 254 to a computing device 290. The computing device 290 may display the 3D body model 254 via a user interface 292. The 3D body model 254 may be of a user that is using the computing device 290 and selects or uploads the images 242 to the server 200.

The data stored in the data store 240 may include the images 242. The images 242 may be two-dimensional (2D) images and/or 3D images. In one example, the images 242 may be of a user's body that have been captured by the image capturing device 280 and uploaded to the server 200. In this example, a single image 242 may be associated with an individual user's body, or multiple images 242 may be associated with an individual user's body. In an alternative example, the images 242 may include a plurality of images that are of various users' bodies. For example, the images 242 may include a plurality of images of users with tall bodies, short bodies, overweight bodies, thin bodies, different body shapes or types, etc., including images of users In this example, one or more of the images 242 may be selected via the user interface 292 of the computing device 290, such that the selected image(s) are similar to a user's own body. In addition, the images 242 may have a defined image file format, such as Joint Photographic Experts Group (JPEG), Tagged Image File Format (TIFF), Graphics Interchange Format (GIF), Windows bitmap (BMP), Portable Network Graphics (PNG), etc. Further, the images 242 may include depth information.

The data stored in the data store 240 may include body landmarks 244. The body landmarks 244 may be identified from the image(s) 242. The body landmarks 244 may be useful for measuring proportions of a human body. Generally, bones may be favorable body landmarks 244 due to minimal change between different body types, as muscle and fat tissue show more change between different body types. The body landmarks 244 may be two-dimensional (2D)

and/or 3D coordinates of human body joints, e.g., left elbow, base of spine, neck, etc., and 2D/3D points along a surface of a body. As further example, the body landmarks 244 may include additional 2D/3D points, such as center of mass of the head, base of the neck, left and right shoulder, left and right elbow, left and right wrist, center of the small of the back, center of the hips, left and right hip, left and right knee, left and right ankle, left and right tip of the feet, neck width, chest width, waist width, hip width, left and right bicep width, left and right forearm width, left and right thigh width, left and right calf width, etc.

The data stored in the data store 240 may include body landmark measurements 246. The body landmark measurements 246 may be distances and/or angles derived from the body landmarks 244, where the body landmarks 244 were previously identified from the image(s) 242. Non-limiting examples of the body landmark measurements 246 may include distance from wrist to elbow, left knee to right knee, width at smallest point of body torso, and angle created by points left shoulder, left elbow, left wrist, etc.

The data stored in the data store 240 may include user metadata 248. The user metadata 248 may include user information received via the user interface 292 of the computing device 290. The user metadata 248 may be associated with the user of the computing device 290 that also selects or uploads the images 242 to the server 200. The user metadata 248 may include a height, weight, age, gender, etc. of the user.

The data stored in the data store 240 may include fiducial maps 250. A fiducial map 250 may be a map of the user's body that includes various types of information that describes or characterizes the user's body. The fiducial map 250 may be generated of the user's body using the body landmarks 244, the body landmark measurements 246 and the user metadata 248. The fiducial map 250 may be specific to a particular user's body. In other words, the fiducial map 250 may be defined based on the body landmarks 244, the body landmark measurements 246 and the user metadata 248. Further, the fiducial map 250 may be defined based on a type of pose associated with the user's body, as determined based on the body landmarks 244. The type of pose may be based on an orientation of body segments, e.g., a first type of pose may indicate that the user's body is standing straight up with arms and legs extended fully and separated from the body. Further, the fiducial map 250 may be defined based on segmented curvatures associated with the user's body, which may indicate a spline of points along a surface of the user's body that is divided into segments by the body landmarks 244, e.g., a particular curvature segment may be an arc of the stomach between the underbust and waist.

The data stored in the data store 240 may include pre-processed fiducial maps 252. The pre-processed fiducial maps 252 may have been previously generated for a plurality of different body types. For example, a particular body type may have a corresponding pre-processed fiducial map 252, where the pre-processed fiducial map 252 may be pre-processed for body landmarks, body landmark measurements, joint positions, widths, circumferences, sagittal distances, volumes, surface areas, heights, contours, etc. for the particular body type. In one example, the pre-processed fiducial maps 252 may include hundreds of thousands of distinct pre-processed fiducial maps corresponding to different user bodies from various locations across the world. Thus, the pre-processed fiducial maps 252 may be likely to have a pre-processed fiducial map that corresponds to a particular user's body.

In an alternative example, an individual pre-processed fiducial map 252 may correspond to an image 242 or a set of images 242. In this example, when the image(s) 242 include the plurality of images that are of various users' bodies, a given image 242 or set of images 242 may correspond to a particular pre-processed fiducial map 252.

The data stored in the data store 240 may include the 3D body models 254. A 3D body model 254 may be a 3D model that visualizes the user's body. The 3D body model 254 may include various coloring, contours, shading, points, etc. that indicate various types of information about the user's body. The 3D body model 254 may be generated from one or more of the pre-processed fiducial maps 252. In one example, the 3D body models 254 may have a variety of uses within industries, such as for evaluating health and wellness, tracking health and wellness, assessing apparel and product fit to enable efficient commerce, customizing or semi-customizing product design, etc.

The data stored in the data store 240 may include body information 256. The body information 256 may accompany the 3D body model 254. The body information 256 may include estimated body measurements of the user's body and an indication of a shape of the user's body. The body information 256 may further include wellness metrics, body shape wellness indices, body composition indices (e.g., body fat percentage, body fat mass, body lean mass, height and weight), estimated clothing sizes, etc. based on the 3D body model 254.

The server 200 may include an image identification module 222, a fiducial map generation module 224, a 3D body model generation module 226, product recommendation module 228, a user interface module 230, and other applications, services, processes, systems, engines, or functionality not discussed in detail herein.

The image identification module 222 may be configured to identify one or more images 242 of a user's human body. In one example, the image identification module 222 may identify the images 242 based on a receipt of the images 242 from the computing device 290 or the image capturing device 280. In this example, the image capturing device 280 may capture the images 242 based on instructions received from the user, and the images 242 may be uploaded to the image identification module 222. In other words, the image identification module 222 may directly receive the images 242 from the image capturing device 280 or the computing device 290.

In an alternative configuration, the image identification module 222 may provide, via the user interface 292, a plurality of images 242 that correspond to distinct human body types. In this example, the image identification module 222 may receive, via the user interface 292, a selection of one or more of the images 242 from the plurality of images 242, where the selected image(s) 242 correspond to the user's body type.

In an alternative configuration, the image identification module 222 may receive, via the user interface 292, input or uploading of a user-selected image(s) 242 of a person other than the user, where the image(s) 242 correspond to the user's body type.

The fiducial map generation module 224 may be configured to identify body landmarks 244 of the user's body based on the image(s) 242. The fiducial map generation module 224 may determine body landmark measurements 246 associated with the body landmarks 244 of the user's body. The fiducial map generation module 224 may identify user metadata 248 received from the computing device 290, where the user metadata 248 may be for the user associated with the images 242. The fiducial map generation module 224 may determine a type of pose associated with the user's body based on the body landmarks 244. The fiducial map generation module 224 may determine segmented curvatures associated with the user's body based on the body landmarks 244. The fiducial map generation module 224 may generate the fiducial map 250 of the user's body using the body landmarks 244, the body landmark measurements 246, the user metadata 248, the type of pose and the segmented curvatures.

In one example, the fiducial map generation module 224 may detect pixel locations of the body landmarks 244 on the images 242 of the user's body. The fiducial map generation module 224 may translate the pixel locations of the body landmarks 244 to 3D coordinates. The fiducial map generation module 224 may use the 3D coordinates to generate the fiducial map 250 of the user's body.

The 3D body model generation module 226 may be configured to identify the fiducial map 250 of the user generated using the images 242 of the user's body. The 3D body model generation module 226 may compare the fiducial map 250 of the user's body to the plurality of pre-processed fiducial maps 252 in the data store 240. The 3D body model generation module 226 may identify, based on the comparison, a pre-processed fiducial map 252 of a human body from the plurality of pre-processed fiducial maps 252 when a correlation value between the fiducial map 250 and the pre-processed fiducial map 252 exceeds a defined threshold. In other words, the 3D body model generation module 226 may identify a pre-processed fiducial map 252 from the data store 240 that is a 'best fit' with the fiducial map 250 of the user's body generated from the images 242. More specifically, the 3D body model generation module 226 may identify the pre-processed fiducial map 252 that is the 'best fit' using a statistical regression model, a machine learning model, principal component analysis, a neural network, an artificial intelligence model, and/or a nearest neighbor classifier. The 'best fit' pre-processed fiducial map 252 may have a highest correlation value as compared to other pre-processed fiducial maps 252 in relation to the fiducial map 250, or a correlation value that exceeds a defined threshold. Then, the 3D body model generation module 226 may generate the 3D body model 254 of the user from the identified 'best fit' pre-processed fiducial map 252.

The product recommendation module 228 may be configured to identify one or more products for sale that are targeted for a body type of the user based on characteristics of the identified pre-processed fiducial map 252 and/or 3D body model 254, such as body landmarks, body landmark measurements, etc. In one example, the products for sale may include clothing having a size that is targeted for the body type of the user based on the characteristics of the identified pre-processed fiducial map 252 and/or 3D body model 254.

The user interface module 230 may be configured to provide the user interface 292 for the computing device 290. The user interface 292 may be used to receive the image(s) 242 of the user's body or a selection of image(s) 242 that are similar to the user's body, receive the user metadata 248, and display the 3D body model and corresponding body information 256. In another example, the user interface 292 may be used to provide a history of 3D body models 254 to the user over a period of time to enable the user to track a progress level. In a further example, the user interface 292 may be used to display the one or more products for sale.

In an alternative configuration, the image identification module 222 may provide, via the user interface 292, a plurality of images 242 that correspond to distinct human body types. In this example, the image identification module 222 may receive, via the user interface 292, a selection of one or more of the images 242 from the plurality of images 242, where the selected image(s) 242 correspond to the user's body type. The fiducial map generation module 224 may identify a pre-processed fiducial map 252 that corresponds to the images 242. The 3D body model generation module 226 may identify a 3D body model that corresponds with the identified pre-processed fiducial map 252. The product recommendation module 228 may identify one or more products for sale that are targeted for a body type of the user based on characteristics of the identified pre-processed fiducial map 252 and/or 3D body model 254, such as body landmarks, body landmark measurements, etc. In addition, the user interface module 230 may provide the 3D body model 254 for display via the user interface 292.

The image capturing device 280 may include one or more digital cameras and/or video recorders that capture images of a user's body. Alternatively, or additionally, the image capturing device 280 may be a thermal imaging camera or infrared camera that captures images of the user's body. In another example, the image capturing device 280 may utilize alternative mechanisms for capturing images of the user's body.

The computing device 290 may comprise a computer system that is embodied in the form of a desktop computer, a laptop computer, a mobile device, a cellular telephone, a smartphone, a set-top box, a network-enabled television, a tablet computer system, or another device with like capability.

The various processes and/or other functionality contained within the server(s) 200 may be executed on one or more processors that are in communication with one or more memory modules. The server(s) 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, time series databases, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 270 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3A:
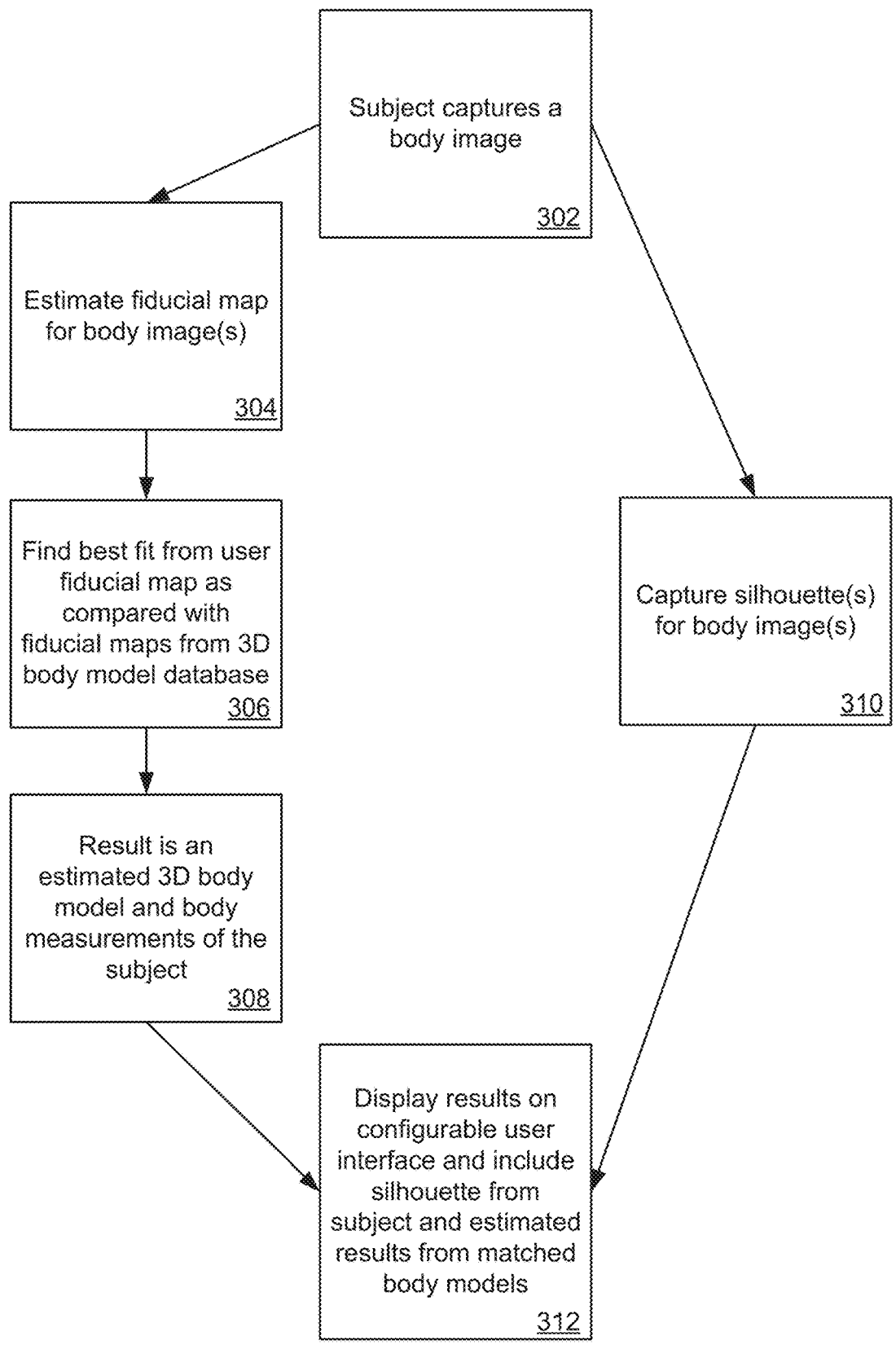
FIGS. 3A and 3B illustrate flowcharts for determining a 3D body model according to an example of the present technology.

FIG. 3A illustrates an exemplary technique for determining a 3D body model. In action 302, a subject or user may capture a body image (i.e., the user's own body image). In action 304, a fiducial map may be estimated for the captured images. In action 306, a 'best fit' fiducial map may be identified based on a comparison between the estimated fiducial map and fiducial maps stored in a 3D body model database. In action 308, an estimated 3D body model and body measurements of the subject may be determined from the 'best fit' fiducial map. In action 310, silhouette(s) for the user's body image may be captured or generated. In action 312, results may be displayed on a configurable user interface that includes the silhouette of the subject and the estimated 3D body model (i.e., a matched body model).

Figure 3B:
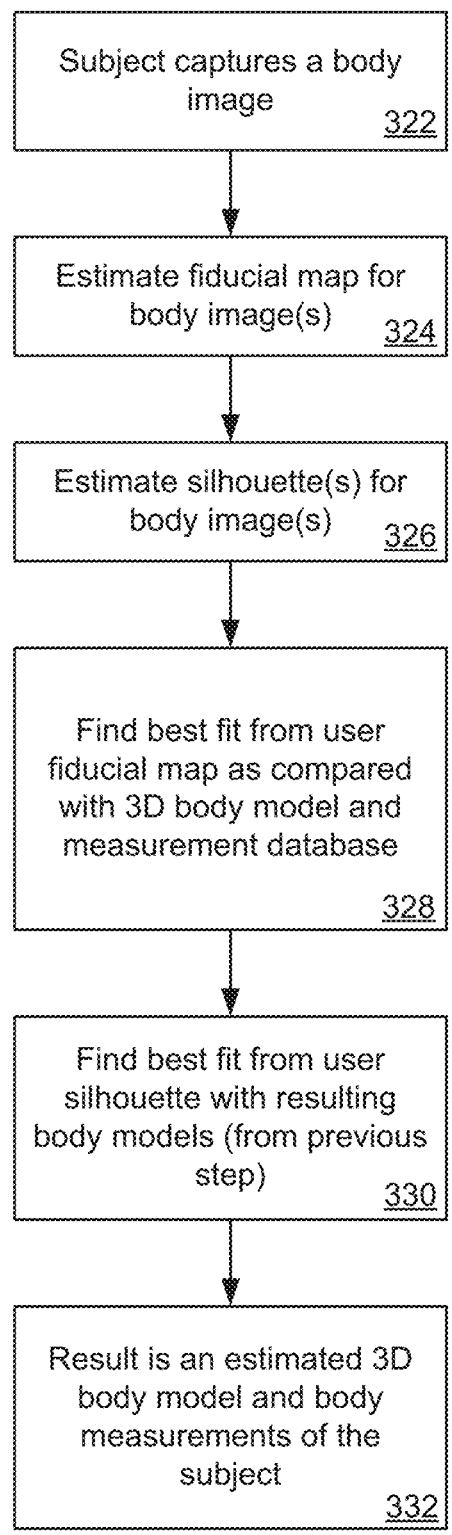

FIG. 3B illustrates an exemplary technique for determining a 3D body model. In action 322, a subject or user may capture a body image (i.e., the user's own body image). In action 324, a fiducial map may be estimated for the captured images. In action 326, silhouette(s) of the user's body image may be estimated or created. In action 328, a 'best fit' fiducial map may be identified based on a comparison between the estimated fiducial map and fiducial maps stored in a 3D body model database. In action 330, a 'best fit' fiducial map may be further defined based on the silhouette(s) of the user's body. In action 332, results may be displayed on a configurable user interface that includes the estimated 3D body model (i.e., a matched body model) and body measurements of the subject.

Figure 4:
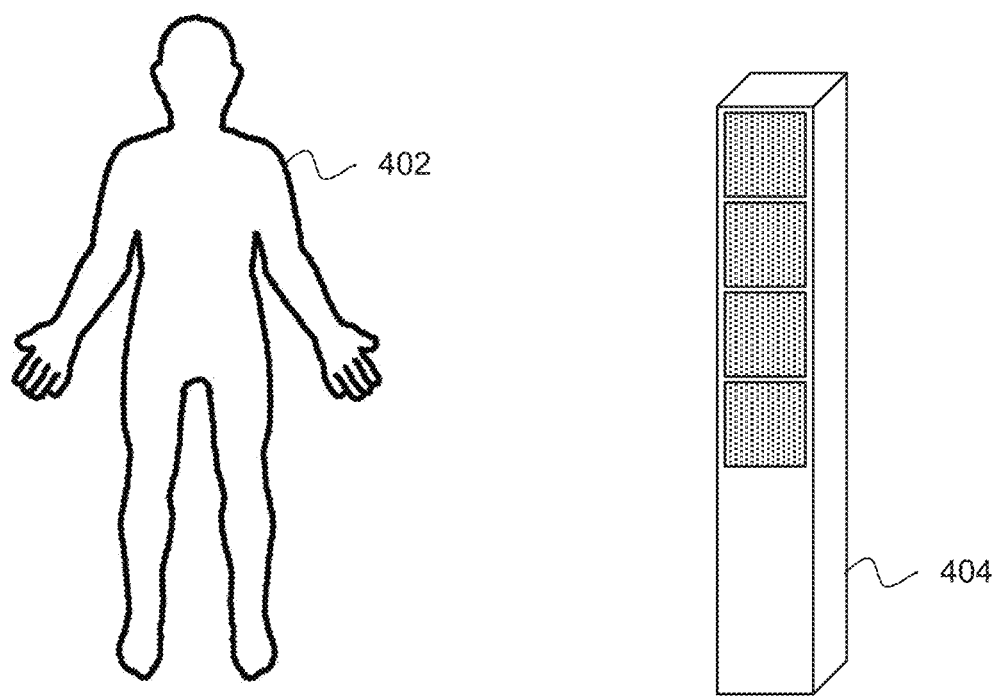
FIG. 4 illustrates a technique for capturing an image using a camera tower according to an example of the present technology.

FIG. 4 illustrates an exemplary technique for capturing an image of a user 402 using a camera tower 404. The camera tower 404 may include one or more cameras at fixed or moving positions. For example, the user 402 may stand in front of the camera tower 404, and the camera tower 404 may capture image(s) of the user 402. In one example, the user 402 may re-position or rotate to enable the camera tower 404 to capture image(s) of the user 402 at one or more angles. The captured images from the camera tower 404 may be used to generate a 3D body model, as previously explained.

Figure 5:
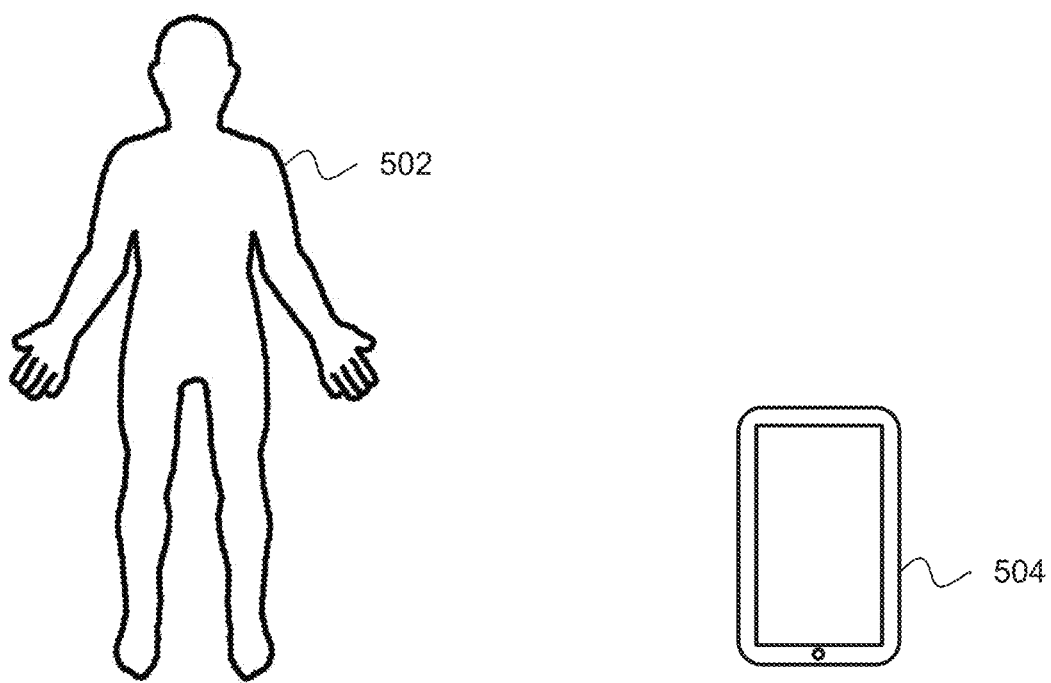
FIG. 5 illustrates a technique for capturing an image using a mobile device according to an example of the present technology.

FIG. 5 illustrates an exemplary technique for capturing an image of a user 502 using a mobile device 504 (or alternatively a tablet computer or a similar type of computational device). For example, the user 502 may position the mobile device 504 in front of the user 502. The mobile device 504 may include a camera that captures image(s) of the user 502. In some cases, one or more cameras may be attached to or embedded within the mobile device 504. In addition, the user 502 may move the mobile device 504 to enable the capture of image(s) of the user 502 at one or more angles.

The captured images from the mobile device 504 may be used to generate a 3D body model, as previously explained.

Figure 6:
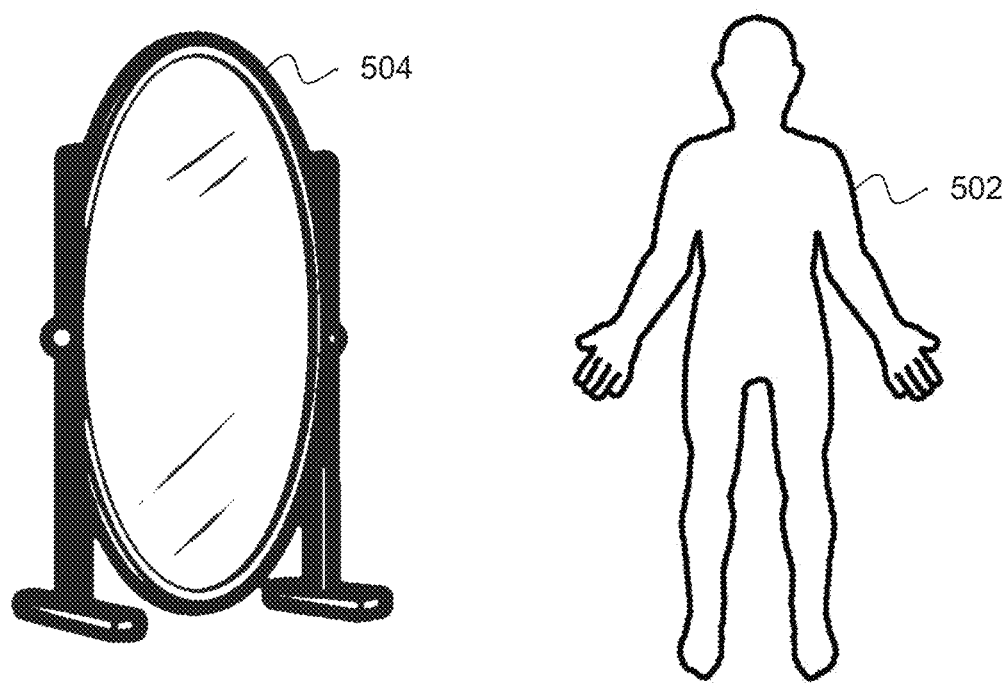
FIG. 6 illustrates a technique for capturing an image using a mirror with one or more embedded or attached cameras according to an example of the present technology.

FIG. 6 illustrates an exemplary technique for capturing an image of a user 602 using a mirror 604 with one or more embedded or attached cameras. For example, the user 602 may stand in front of the mirror 604 with one or more embedded or attached cameras, and the mirror 604 with the embedded or attached camera(s) may capture one or more images of the user 602. In one example, the user 602 may re-position or rotate to enable the mirror 604 with embedded or attached camera(s) to capture images of the user 602 at one or more angles. The captured images from the mirror 604 with embedded or attached cameras may be used to generate a 3D body model, as previously explained.

Figure 7:
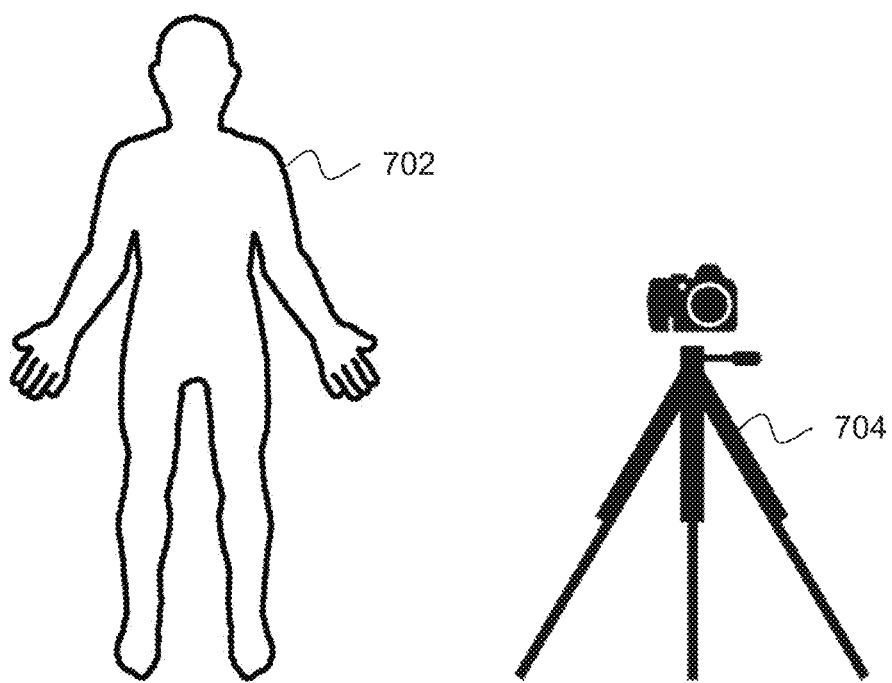
FIG. 7 illustrates a technique for capturing an image using a camera on a stand according to an example of the present technology.

FIG. 7 illustrates an exemplary technique for capturing an image of a user 702 using a camera 704 on a stand. For example, the user 702 may stand in front of the camera 704 on the stand, and the camera 704 on the stand may capture image(s) of the user 702. In one example, the user 702 may re-position or rotate to enable the camera 704 on the stand to capture image(s) of the user 702 at one or more angles. In this example, the images captured by the camera 704 on the stand may be processed by another device. The captured images from the camera 704 on the stand may be used to generate a 3D body model, as previously explained.

Figure 8:
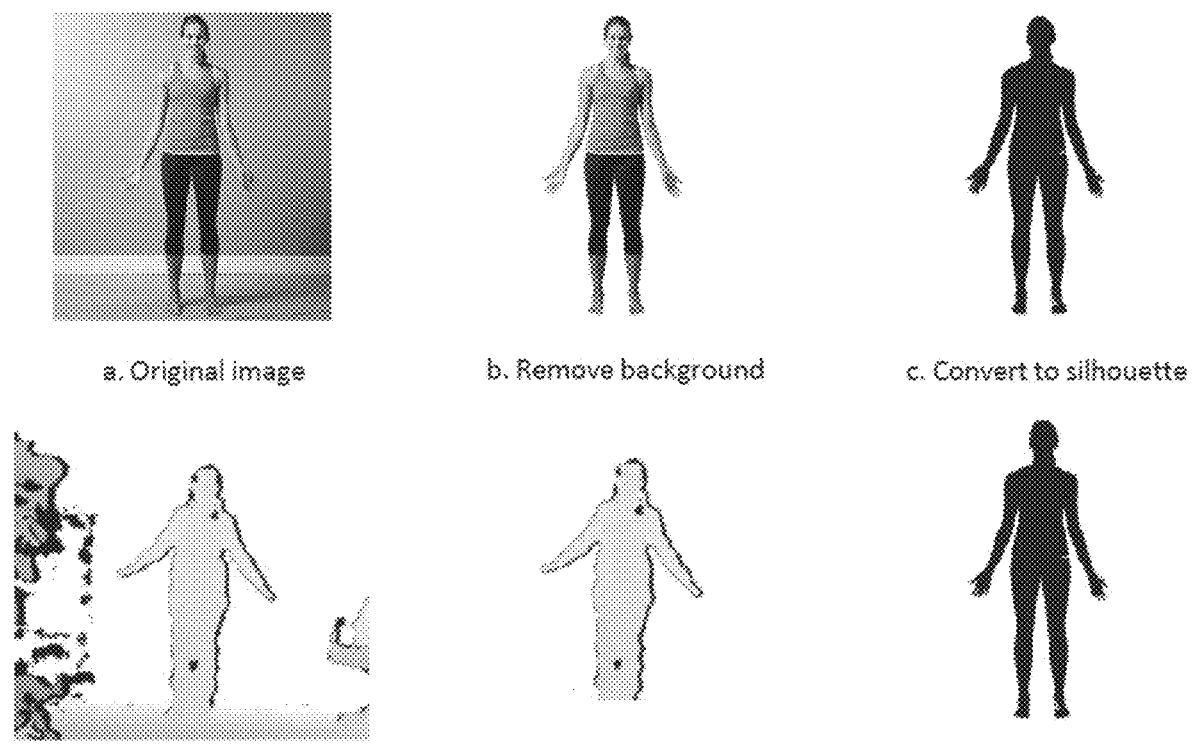
FIG. 8 illustrates a technique for extracting a silhouette from one or more images for display on a configurable user interface according to an example of the present technology.

FIG. 8 illustrates an exemplary technique for extracting a silhouette from one or more images for display on a configurable user interface. For example, an original image of a user's body may be identified. The image may be processed to remove a background of the image using a background filter, thereby leaving the user's body image. For example, a background filter may be applied which identifies edges of objects in the image. Objects other than the human body may be removed. The background filter may create an image mask which, when overlayed on the original image, occludes the background, leaving the user. The image may be further processed to convert the user's body image to a silhouette. In other words, the user image excluding the background may be converted to a solid dark region. The silhouette may be a darkened region that corresponds with the user's body image, with the background being removed.

Figure 9:
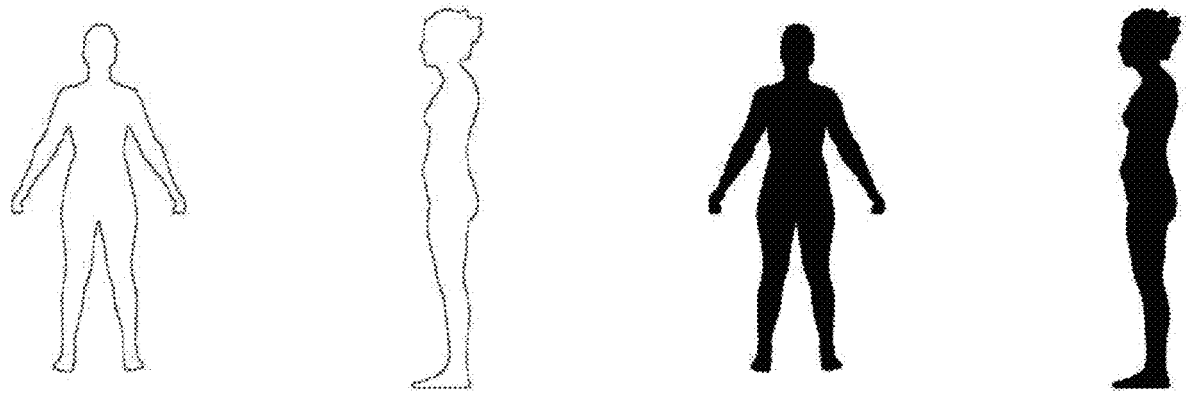
FIG. 9 illustrates a body silhouette profile according to an example of the present technology.

FIG. 9 illustrates an exemplary body silhouette profiles. The body silhouette profiles may include any of various configurations of silhouettes of a user's body. For example, the body silhouette profile may include a first silhouette in which the user's body is facing forward and is an outline of the user's body, a second silhouette in which the user's body is facing sideways and is an outline of the user's body, a third silhouette in which the user's body is facing forward and is a darkened region that corresponds with the user's body, or a fourth silhouette in which the user's body is facing sideways and is a darkened region that corresponds with the user's body.

Figure 10:
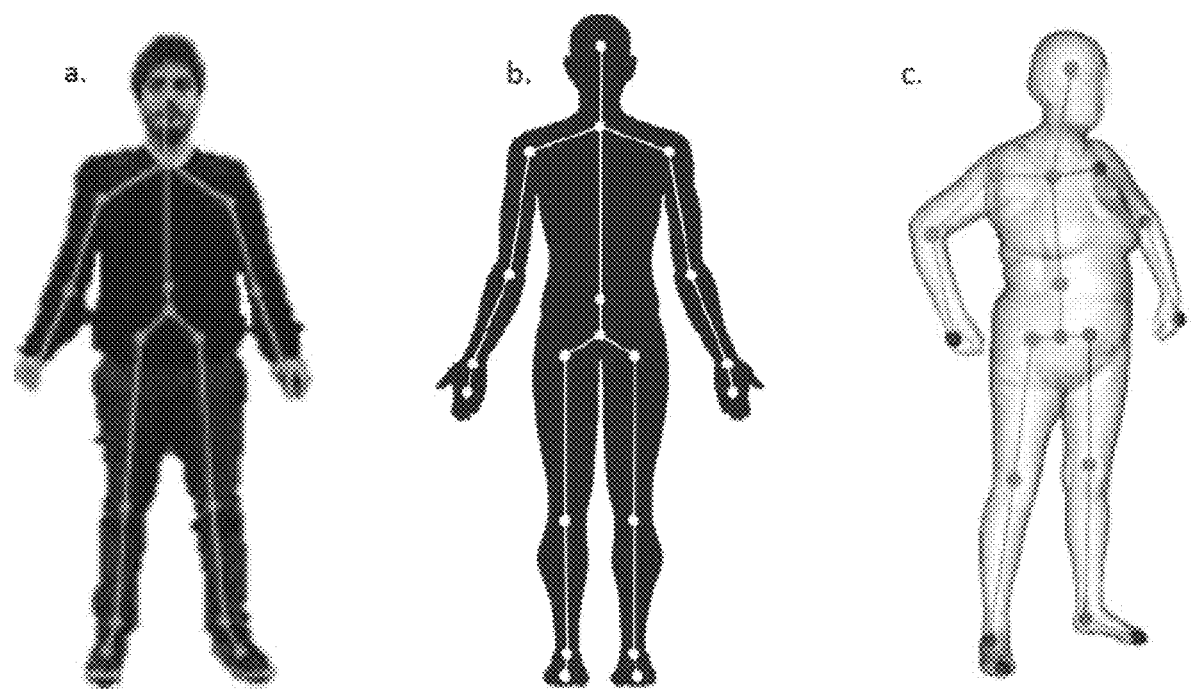
FIG. 10 illustrates correlating joints to a still image of a human body, a reference body and a 3D body model according to an example of the present technology.

FIG. 10 illustrates examples of joints corresponding to a user's body. In a first example (a), joints may be correlated to a still image of the user's body. In a second example (b), joints may be correlated to a reference body that is similar to the user's body. In a third example (c), joints may be correlated to a 3D body model that is generated based on the reference body that is similar to the user's body.

Figure 11:
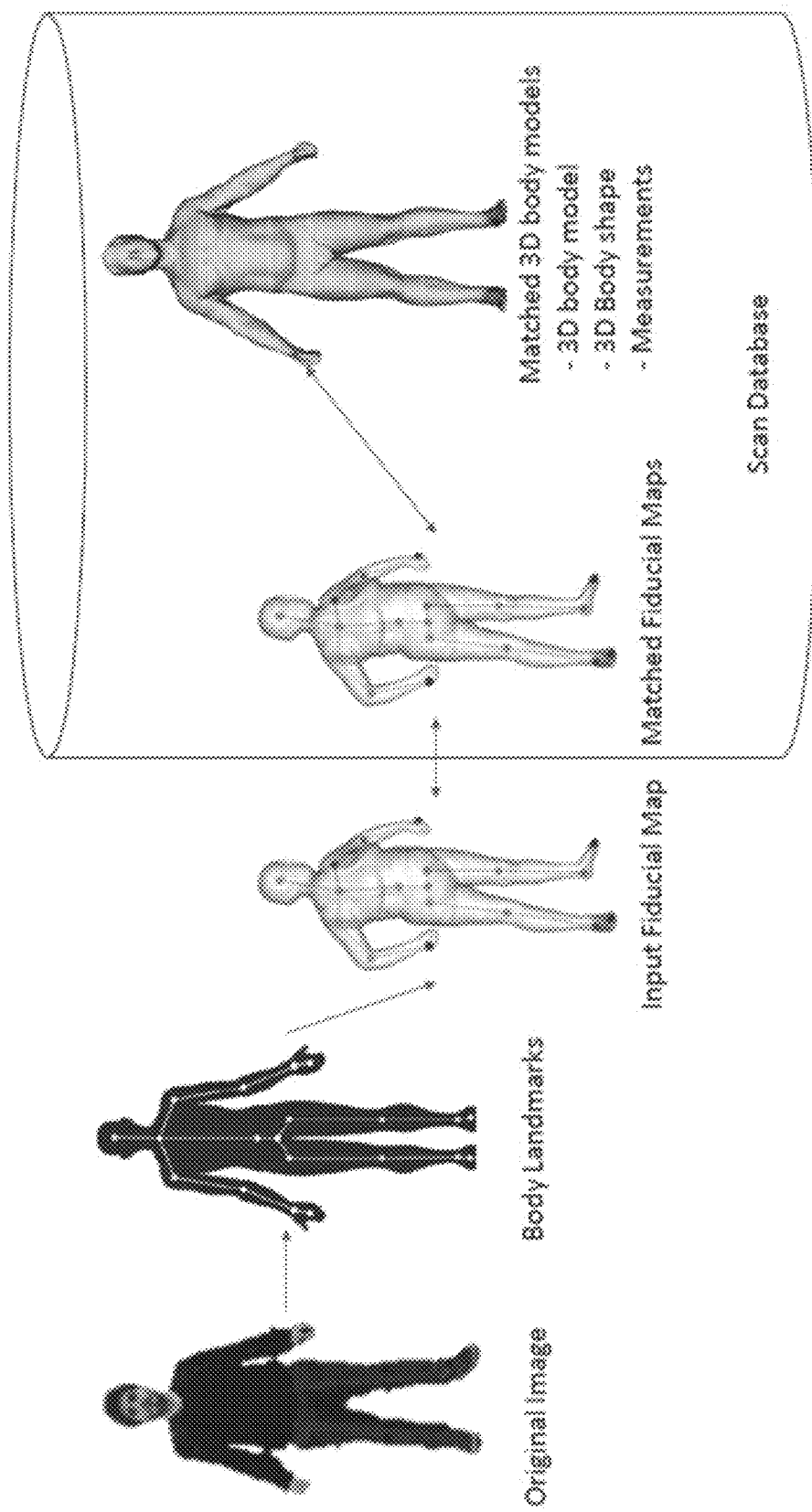
FIG. 11 illustrates a technique for identifying a 3D body model by matching an input fiducial map to a plurality of fiducial maps in a data store according to an example of the present technology.

FIG. 11 illustrates an exemplary technique for identifying a 3D body model by matching an input fiducial map to a plurality of fiducial maps in a data store. More specifically, an original image of a user's body may be identified. Body landmarks may be identified from the image. An input fiducial map may be generated using the body landmarks identified from the image. The input fiducial map may be compared to the plurality of fiducial maps in the data store, and based on the comparison, a matched fiducial map may be identified from the data store. The matched fiducial map may be used to generate the 3D body model.

FIG. 12 is an exemplary table that includes joint and body landmark information extracted from a 3D body model and metadata received from a user via a user interface. The joint and body landmark information may include various lengths, such as head to shoulder center, right/left shoulder to shoulder center, right/left shoulder to right/left elbow, right/left elbow to right/left wrist, shoulder center to hip center, right/left hip to hip center, right/left hip to right/left knee, or right/left knee to right/left ankle. The joint and body landmark information may include various widths, such as neck width, chest width, waist width, hip width, right/left bicep width, right/left forearm width, right/left thigh width, or right/left calf width. The metadata may include height, weight, gender, ethnicity or age. In this table, the cell data in one column to the next along a row is not associated, but in an alternative example, the rows and columns may be correlated such that a particular value in a cell in one column corresponds to another value in a cell in another column along a same row, such as to correlate a 'head to foot' length with a metadata 'height' name.

Figure 13:
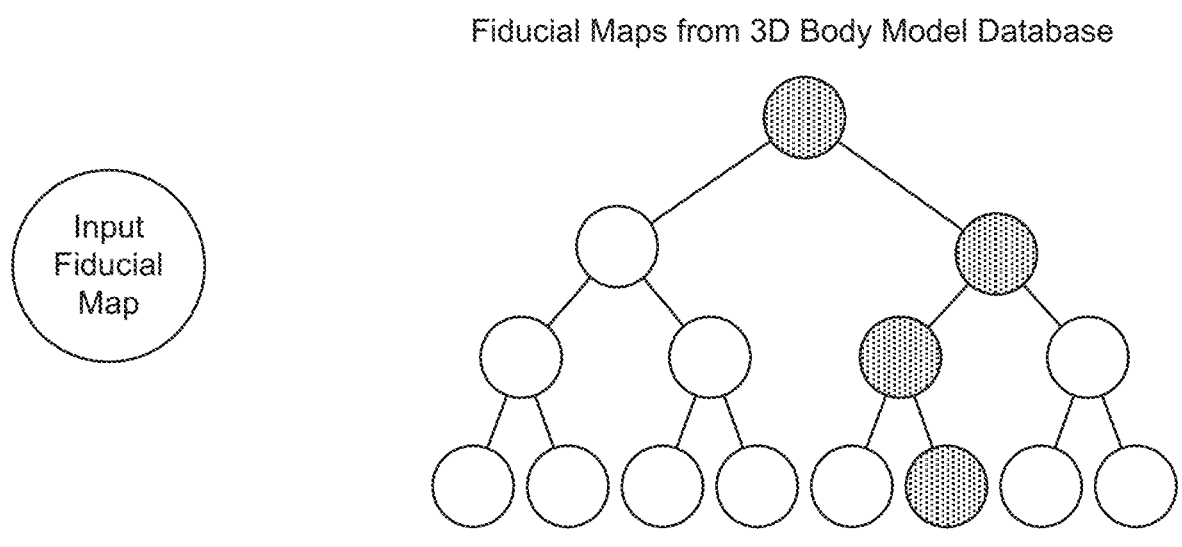
FIG. 13 illustrates a technique for identifying a 'best fit' 3D body model based on a fiducial map of an input user that descends a tree data structure according to an example of the present technology.

FIG. 13 illustrates an exemplary technique for identifying a 'best fit' 3D body model based on an input fiducial map of a user that descends a tree data structure. For example, fiducial maps from a 3D body model database may be organized in the tree data structure. The input fiducial map of the user may descend the tree data structure of the 3D body model database in order to identify the 'best fit' 3D body model. Each descent further down the tree structure may represent a closer fit, such as a closer matching of a fiducial marker or such as a matching of an additional fiducial marker after matching a different fiducial marker previously.

Figure 14:
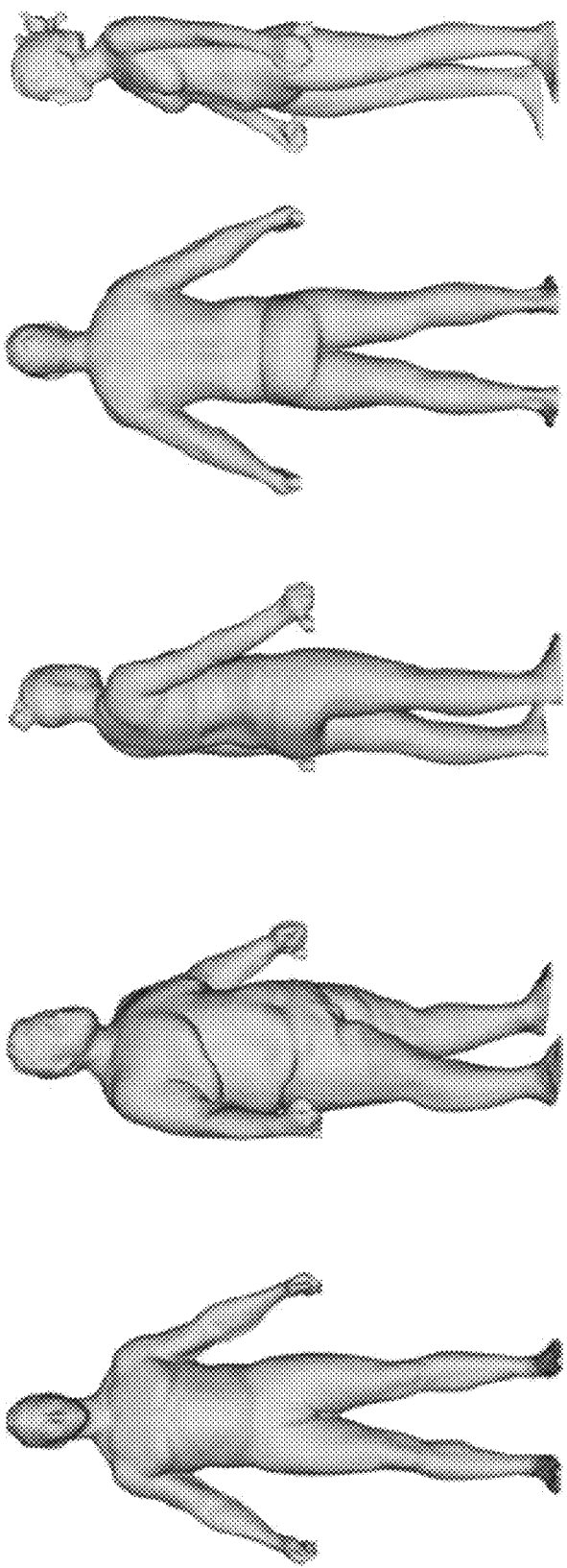
FIG. 14 illustrates a plurality of 3D body models stored in a data store according to an example of the present technology.

FIG. 14 illustrates an example of a plurality of 3D body models stored in a data store. The 3D body models may be in various positions, such as facing forward, facing sideways, facing backwards, etc. The 3D body models may correspond to male users, female users, etc. of various ages and body types (e.g., skinny, overweight, tall, short, etc.). The 3D body models may be constructed based on corresponding fiducial maps. In one example, a data store of 3D body models created using 3D body scanning technology may be available with corresponding fiducial maps as a basis for comparison with user images or user-selected images, or for comparison with fiducial maps or 3D body models of user images or user-selected images.

Figure 15:
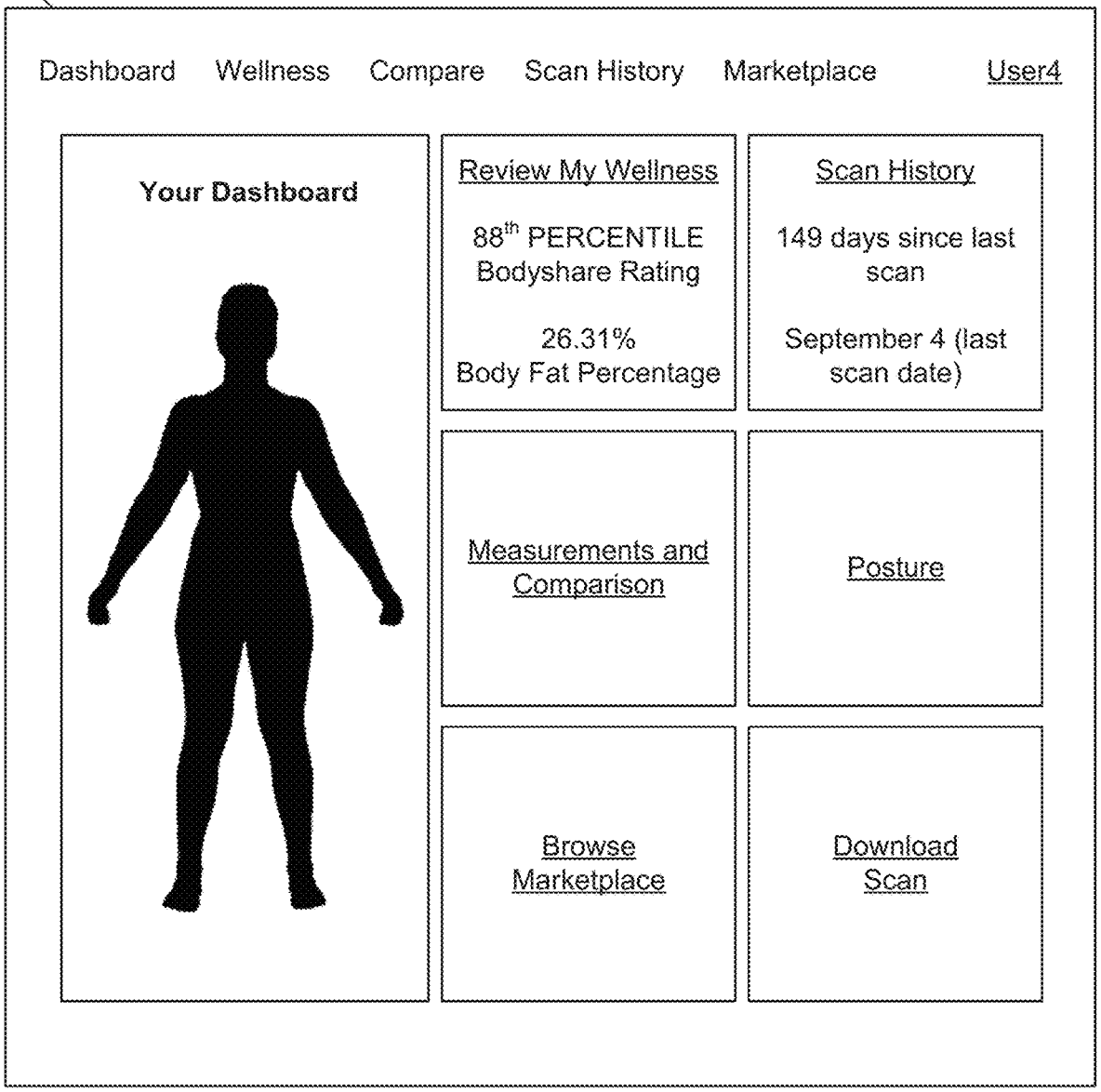
FIG. 15 illustrates a configurable user interface that enables a user to review matched body model silhouettes, wellness metrics and other components associated with measurements and images according to an example of the present technology.

FIG. 15 illustrates an exemplary configurable user interface 1500 that enables a user to review matched 3D body models, matched body model silhouettes, wellness metrics or wellness indices (e.g., body fat percentage), posture information, and other components associated with measurements and images. In addition, the user interface 1500 may include an electronic link to an electronic marketplace or retail store that contains products that are targeted to the user's body type.

Figure 16:
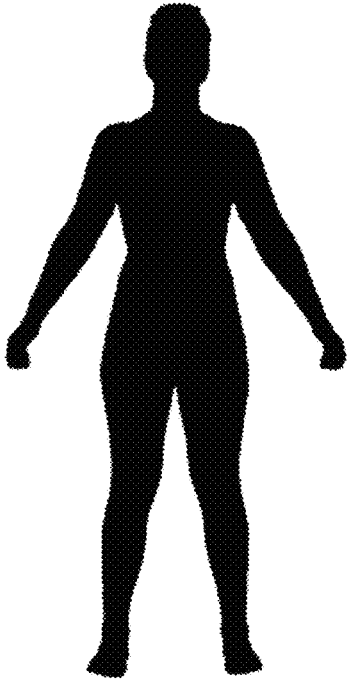
FIG. 16 illustrates a configurable user interface that enables a user to review matched 3D body models and a list of measurements for the matched 3D body models according to an example of the present technology.

FIG. 16 illustrates an exemplary configurable user interface 1600 that enables a user to review matched 3D body models and a list of measurements for the matched 3D body models. The list of measurements may be for neck, bust, waist, hips, left biceps, right biceps, left forearm, right forearm, left thigh, right thigh, left calf, right calf, etc.

Figure 17:
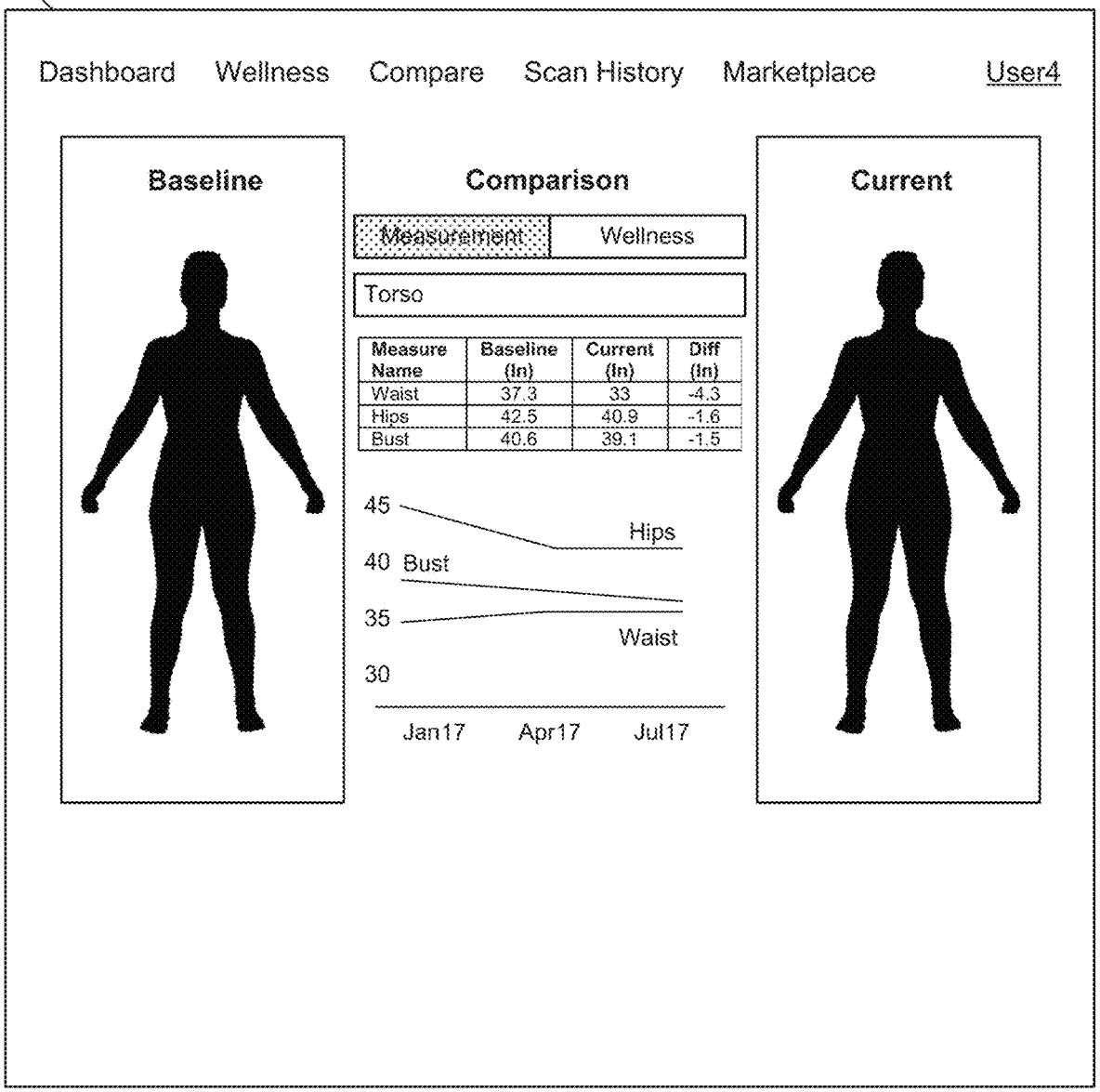
FIG. 17 illustrates a configurable user interface that enables a user to compare changes between two or more matched 3D body models and changes in measurements and/or wellness metrics according to an example of the present technology.

FIG. 17 illustrates an exemplary configurable user interface 1700 that enables a user to compare changes between two or more matched 3D body models and changes in measurements and/or wellness metrics. The user interface 1700 may enable the user to access images, wellness metrics, measurements, etc. and compare that with images, wellness metrics, measurements, etc. of previously estimated matched 3D body models. The user interface 1700 may include graphical data (e.g., charts or tables) that enable the user to evaluate progress over a period of time. For example, the user interface 1700 may include a chart and corresponding table that indicates changes in measurements and wellness metrics for the user over a period of time.

Figure 18:
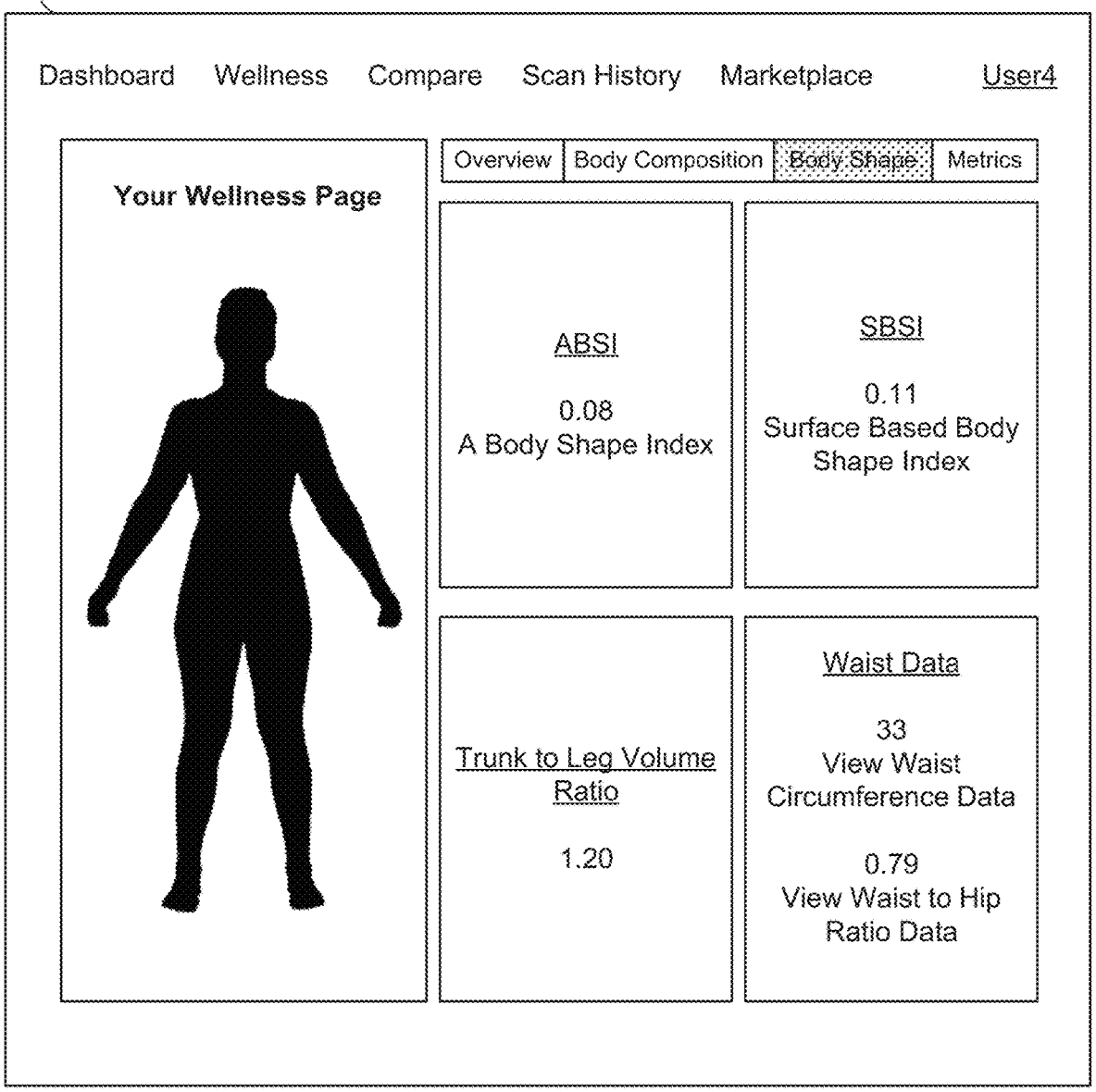
FIG. 18 illustrates a configurable user interface that enables a user to review matched 3D body models and body shape scores for the matched 3D body models according to an example of the present technology.

FIG. 18 illustrates an exemplary configurable user interface 1800 that enables a user to review matched 3D body models and body shape scores for the matched 3D body models. The user interface 1800 may enable the user to access images and body shape wellness indexes, such as a body shape index, a surface based body shape index, a trunk to leg volume ratio, waist circumference data, waist to hip ratio data, etc. as may be determined based on the 3D body models. The user interface 1800 may enable the user to view information about body composition, body shape and/or body metrics.

Figure 19:
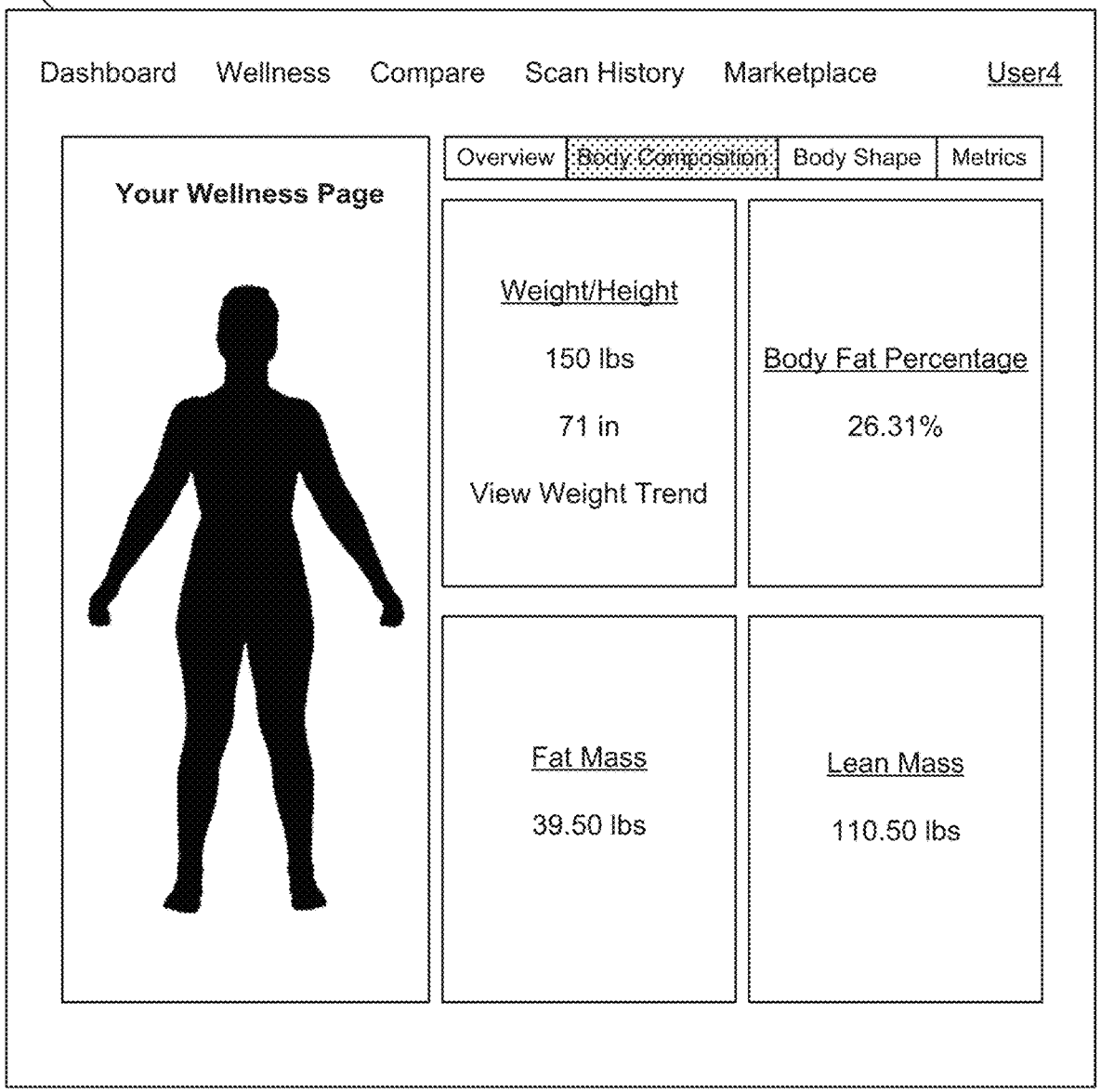
FIG. 19 illustrates a configurable user interface that enables a user to review matched 3D body models and body composition values for the matched 3D body models according to an example of the present technology.

FIG. 19 illustrates an exemplary configurable user interface 1900 that enables a user to review matched 3D body models and body composition values for the matched 3D body models. The user interface 1900 may enable the user to access images and body composition indices, such as body fat percentage, body fat mass, body lean mass, height, weight, etc. The user interface 1900 may enable the user to view information about body composition, body shape and/ or body metrics.

Figure 20:
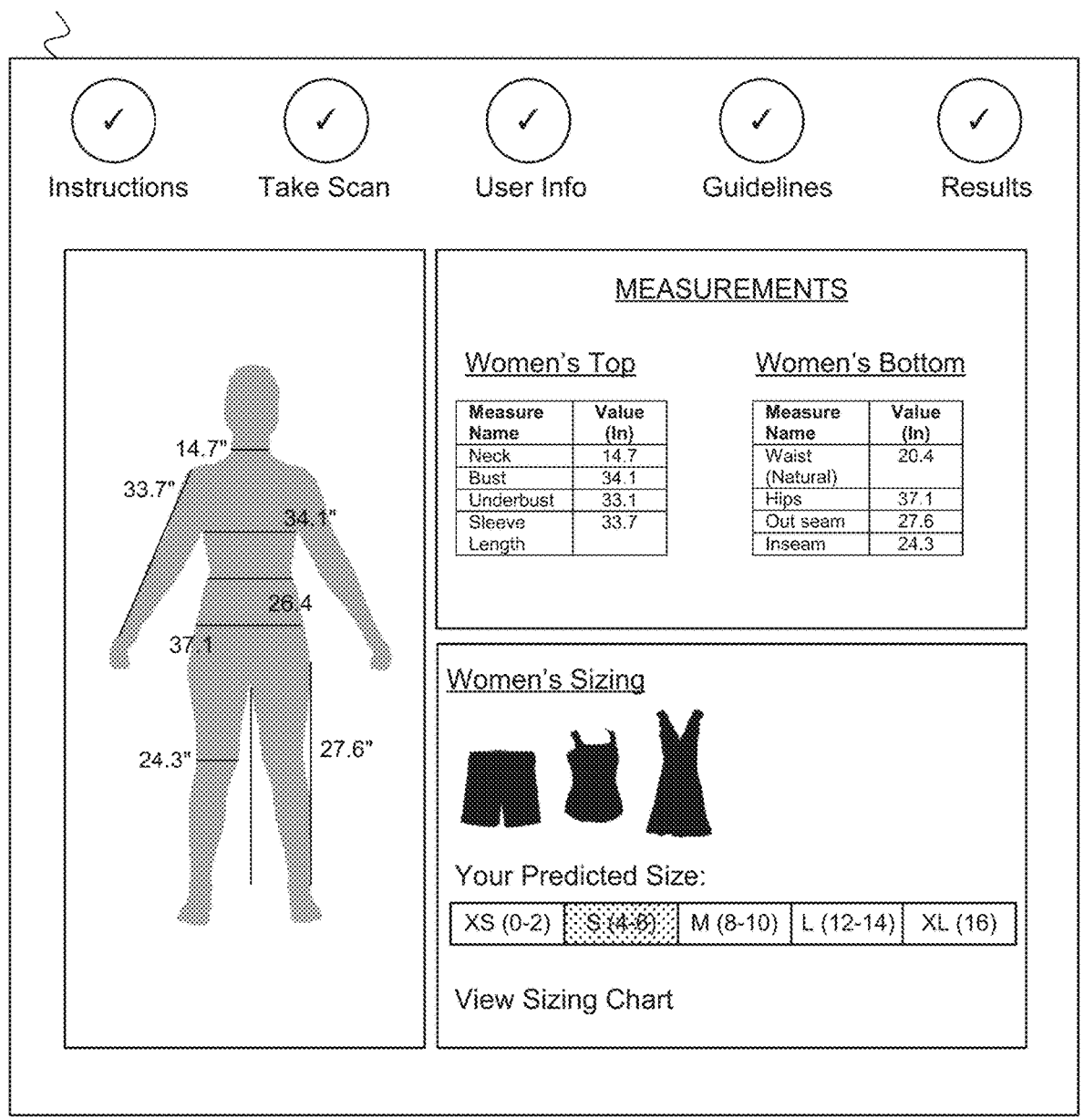
FIG. 20 illustrates a configurable user interface that enables a user to review matched 3D body models, body measurements for a specific purpose, such as clothing sizing, and suggestive sizes per piece of clothing or apparel according to an example of the present technology.

FIG. 20 illustrates an exemplary configurable user interface 2000 that enables a user to review matched 3D body models, body measurements for a specific purpose such as clothing and suggestive sizes per piece of clothing or apparel. The user interface 2000 may enable the user to access images and measurements specifically designed for use cases in which body measurements are important. For example, the user interface 2000 may enable the user to access estimated body measurements for clothing and apparel fitting. In this example, the body measurements may be integrated with an apparel size chart, whereby the user may ascertain via the user interface 2000 a suggested clothing size based on the estimated body measurements. In one example, the user interface 2000 may be associated with a clothing retailer and may assist users in selecting clothing sizes that will fit the user's measurements. The clothing retailer may send user images to a remote server, which may be operated independently of the clothing retailer, for calculation of measurements, clothing sizes, or the like. In one aspect, the measurements may be returned by the remote server and the clothing retailer may determine the appropriate clothing sizes based on the returned measurements. The user interface 2000 may be configured to suit specific applications. For example, the user interface 2000 may enable a user to submit an image and then may show a predicted size, optionally with suggested clothing matching the predicted size. Other features in this example, such as an outline of the body, specific measurements, 3D models, etc. may be omitted from the user interface 2000.

Figure 21:
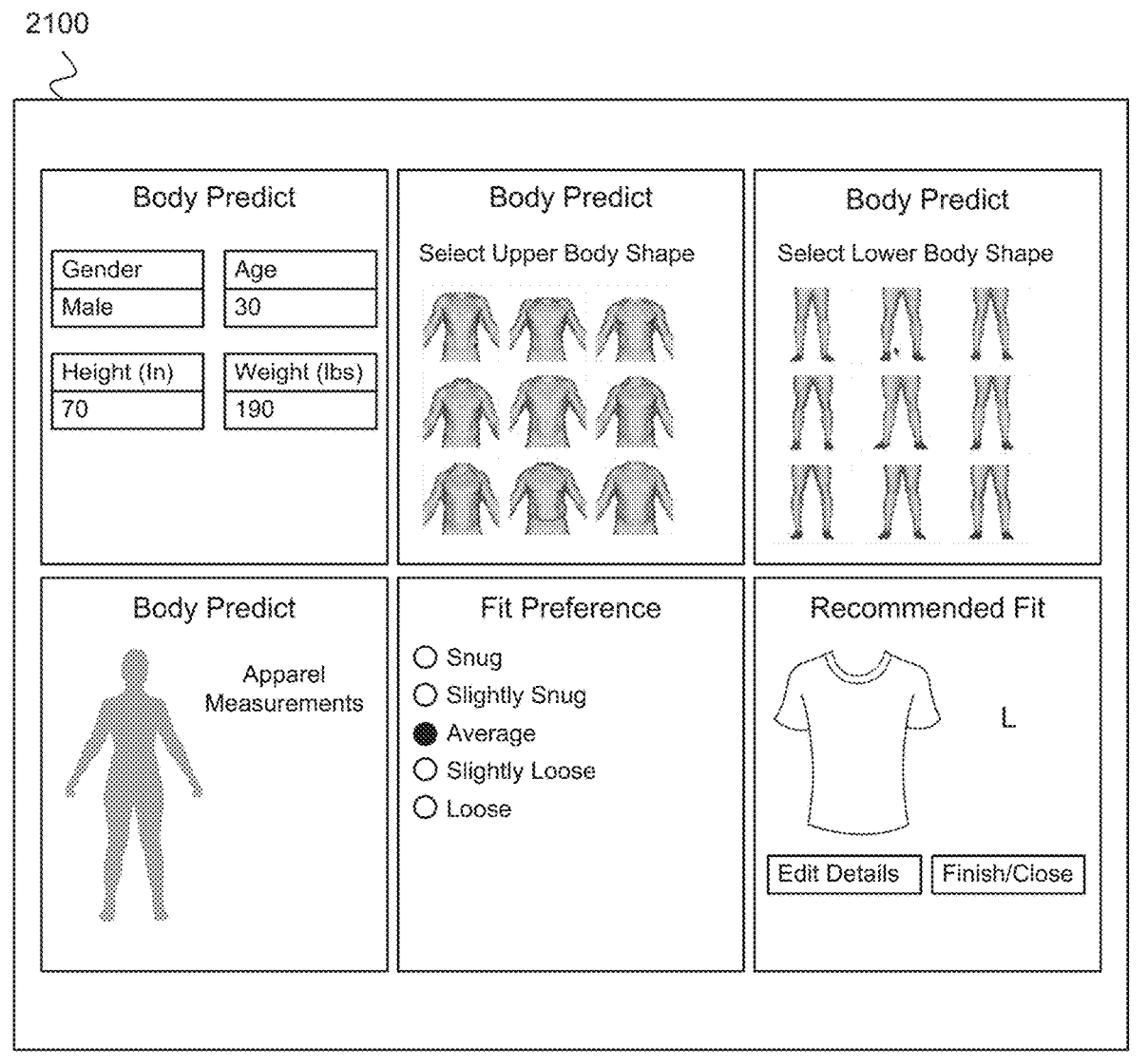

FIG. 21 illustrates an exemplary configurable user interface 2100 that enables a user to provide known demographic information, select from a set of body segments, select a clothing fit preference and receive recommendations for an appropriate clothing size. For example, the user interface 2100 may enable the user to provide information about gender, age, height and weight. The user interface 2100 may enable the user to select an upper body shape. The user interface 2100 may enable the user to select a lower body shape. The user interface 2100 may enable the user to select a fit preference, such as snug, slightly snug, average, slightly loose or loose. Then, the user interface 2100 may provide a recommendation for clothing having the appropriate clothing size.

In one configuration, the configurable user interface 1500, 1600, 1700, 1800, 1900, 2000, 2100 (FIGS. 15-21) may be accessible to a user via an application that may live as a native application or a web or mobile application, which may connect to a web API.

Figure 22:
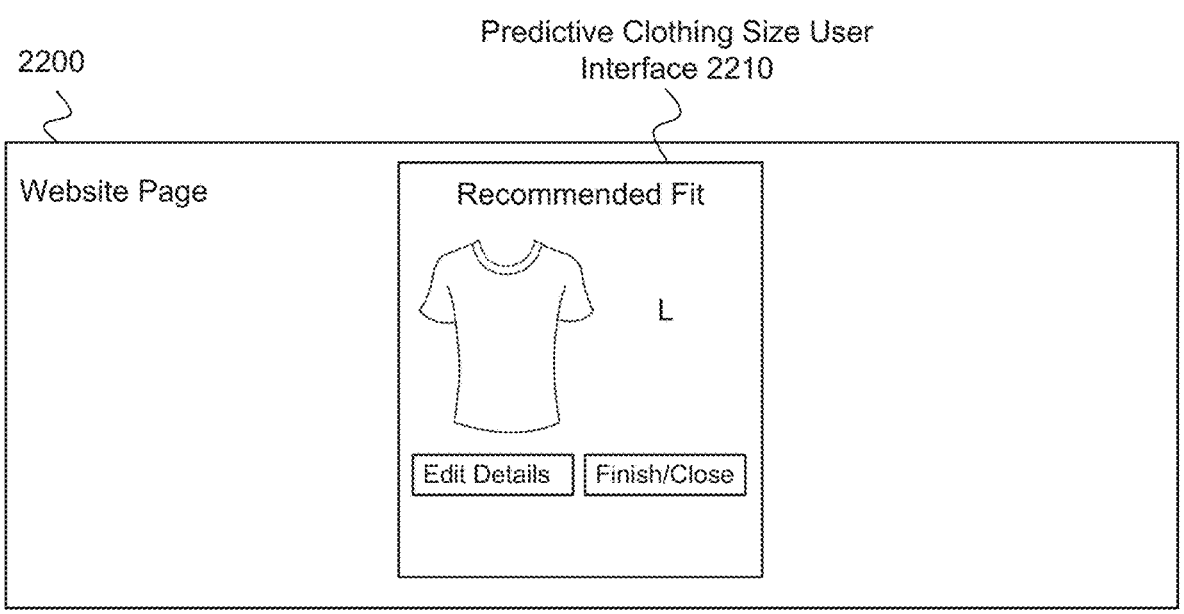
FIG. 22 illustrates a predictive widget as a modal dialog that overlays an electronic product page according to an example of the present technology.

FIG. 22 illustrates an exemplary predictive widget as a modal dialog box that overlays an electronic product page. For example, the predictive widget may be a predictive clothing size user interface 2210 and the electronic product page may be a website page 2200. The predictive clothing size user interface 2210 may overlay the website page 2200. The predictive clothing size user interface 2210 may enable a user to provide known demographic information, select from a set of body segments, select a clothing fit preference and receive recommendations for an appropriate clothing size. The predictive clothing size user interface 2210 may be closed when the user wishes to return to the website page 2200, or after a selection has been made on the predictive clothing size user interface 2210.

Figure 23:
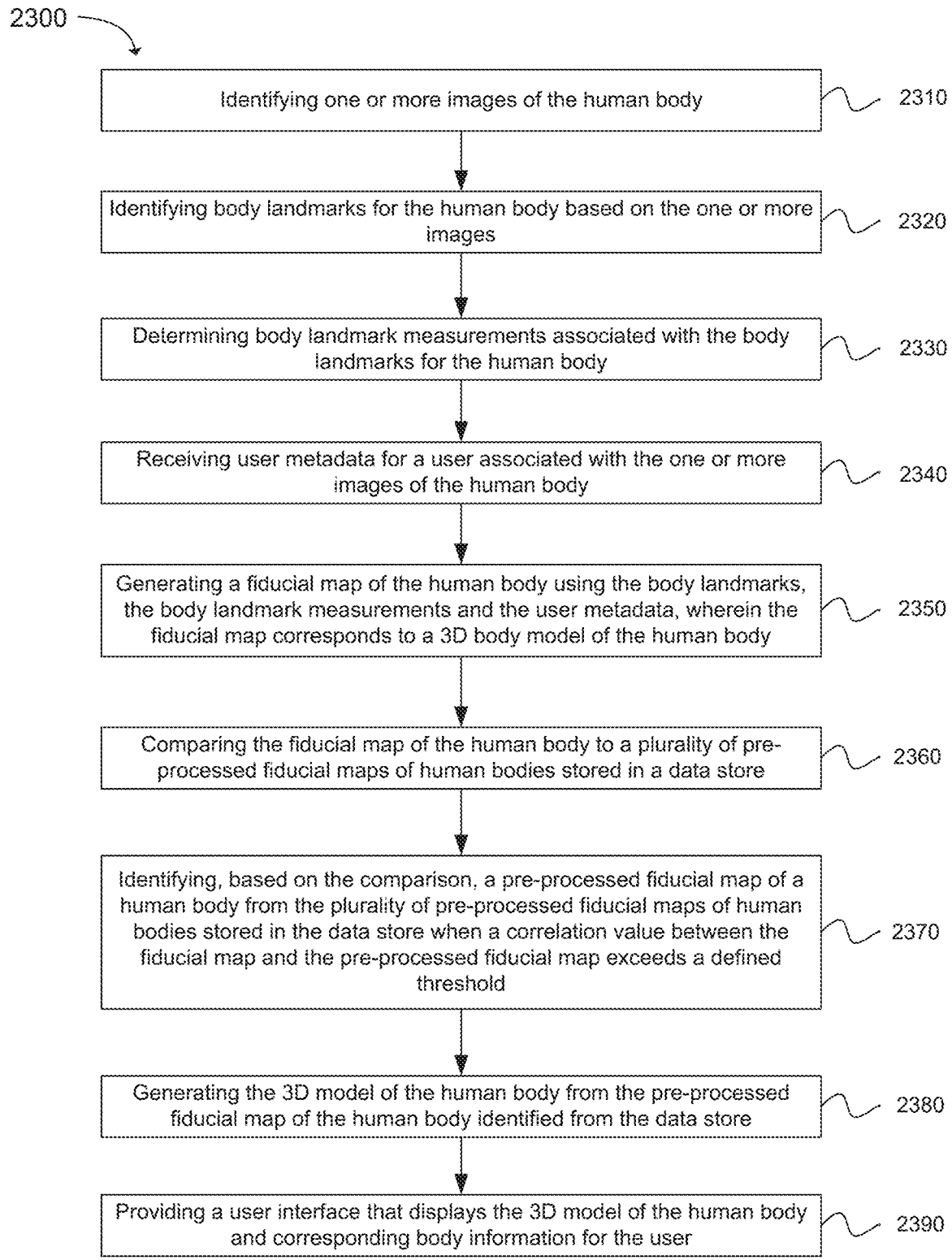
FIG. 23 is a flowchart of an example method for generating a three-dimensional (3D) model of a human body.

Another example provides a method 2300 for generating a three dimensional (3D) model of a human body, as shown in the flow chart in FIG. 23. The method may be executed as instructions on a machine, where the instructions are included on at least one computer readable medium or one non-transitory machine readable storage medium. The method can include the operation of identifying one or more images of the human body, as in block 2310. The method can include the operation of identifying body landmarks for the human body based on the one or more images, as in block 2320. The method can include the operation of determining body landmark measurements associated with the body landmarks for the human body, as in block 2330. The method can include the operation of receiving user metadata for a user associated with the one or more images of the human body, as in block 2340. The method can include the operation of generating a fiducial map of the human body using the body landmarks, the body landmark measurements and the user metadata, wherein the fiducial map corresponds to a 3D body model of the human body, as in block 2350. The method can include the operation of comparing the fiducial map of the human body to a plurality of pre-processed fiducial maps of human bodies stored in a data store, as in block 2360. The method can include the operation of identifying, based on the comparison, a pre-processed fiducial map of a human body from the plurality of pre-processed fiducial maps of human bodies stored in the data store when a correlation value between the fiducial map and the pre-processed fiducial map exceeds a defined threshold, as in block 2370. The method can include the operation of generating the 3D model of the human body from the pre-processed fiducial map of the human body identified from the data store, as in block 2380. The method can include the operation of providing a user interface that displays the 3D model of the human body and corresponding body information for the user, as in block 2390.

Figure 24:
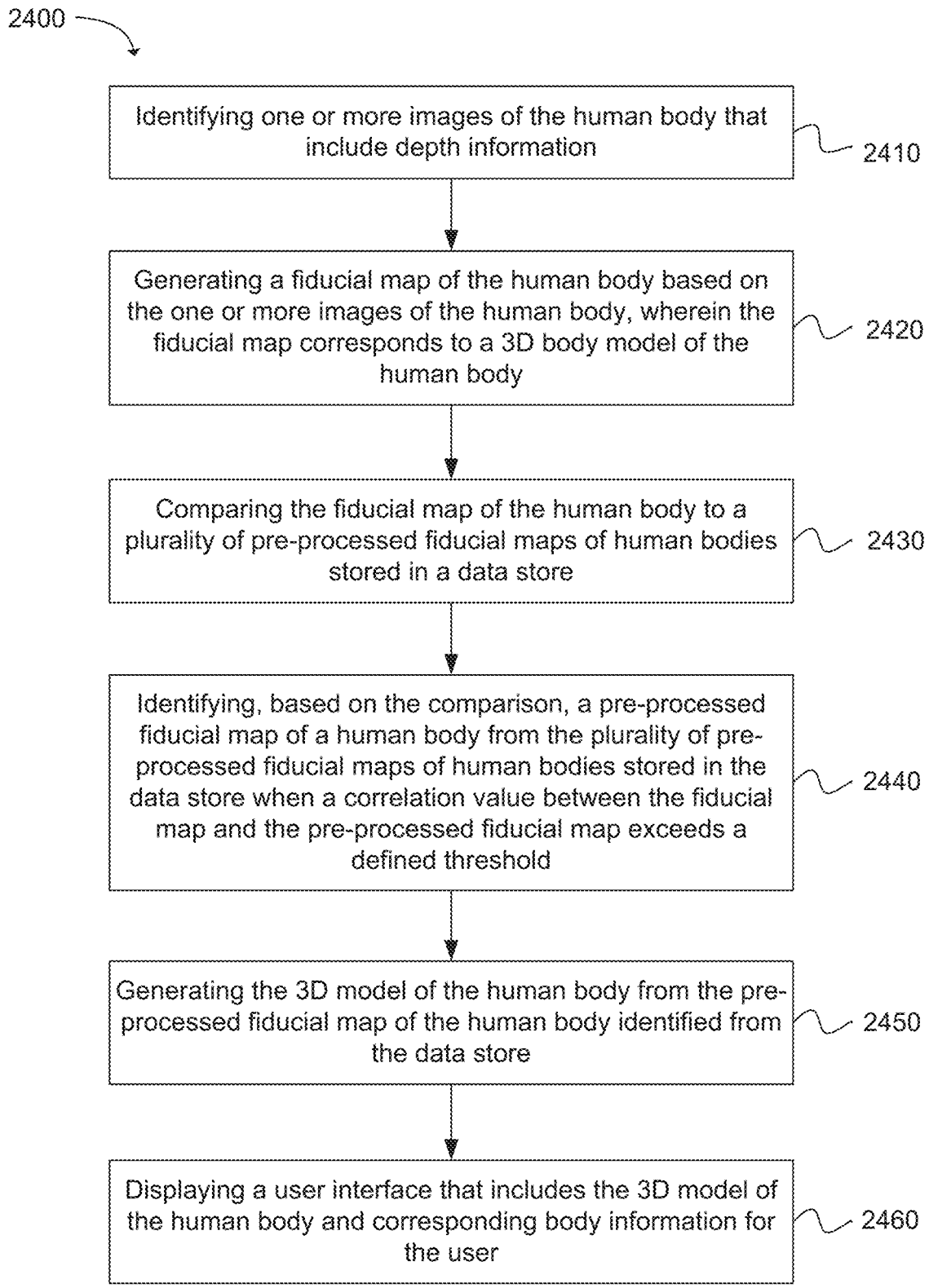
FIG. 24 is a flowchart of another example method for generating a three-dimensional (3D) model of a human body.

Another example provides a method 2400 for generating a three dimensional (3D) model of a human body, as shown in the flow chart in FIG. 24. The method may be executed as instructions on a machine, where the instructions are included on at least one computer readable medium or one non-transitory machine readable storage medium. The method can include the operation of identifying one or more images of the human body that include depth information, as in block 2410. The method can include the operation of generating a fiducial map of the human body based on the one or more images of the human body, wherein the fiducial map corresponds to a 3D body model of the human body, as in block 2420. The method can include the operation of comparing the fiducial map of the human body to a plurality of pre-processed fiducial maps of human bodies stored in a data store, as in block 2430. The method can include the operation of identifying, based on the comparison, a pre-processed fiducial map of a human body from the plurality of pre-processed fiducial maps of human bodies stored in the data store when a correlation value between the fiducial map and the pre-processed fiducial map exceeds a defined threshold, as in block 2440. The method can include the operation of generating the 3D model of the human body from the pre-processed fiducial map of the human body identified from the data store, as in block 2450. The method can include the operation of displaying a user interface that includes the 3D model of the human body and corresponding body information for the user, as in block 2460.

Figure 25:
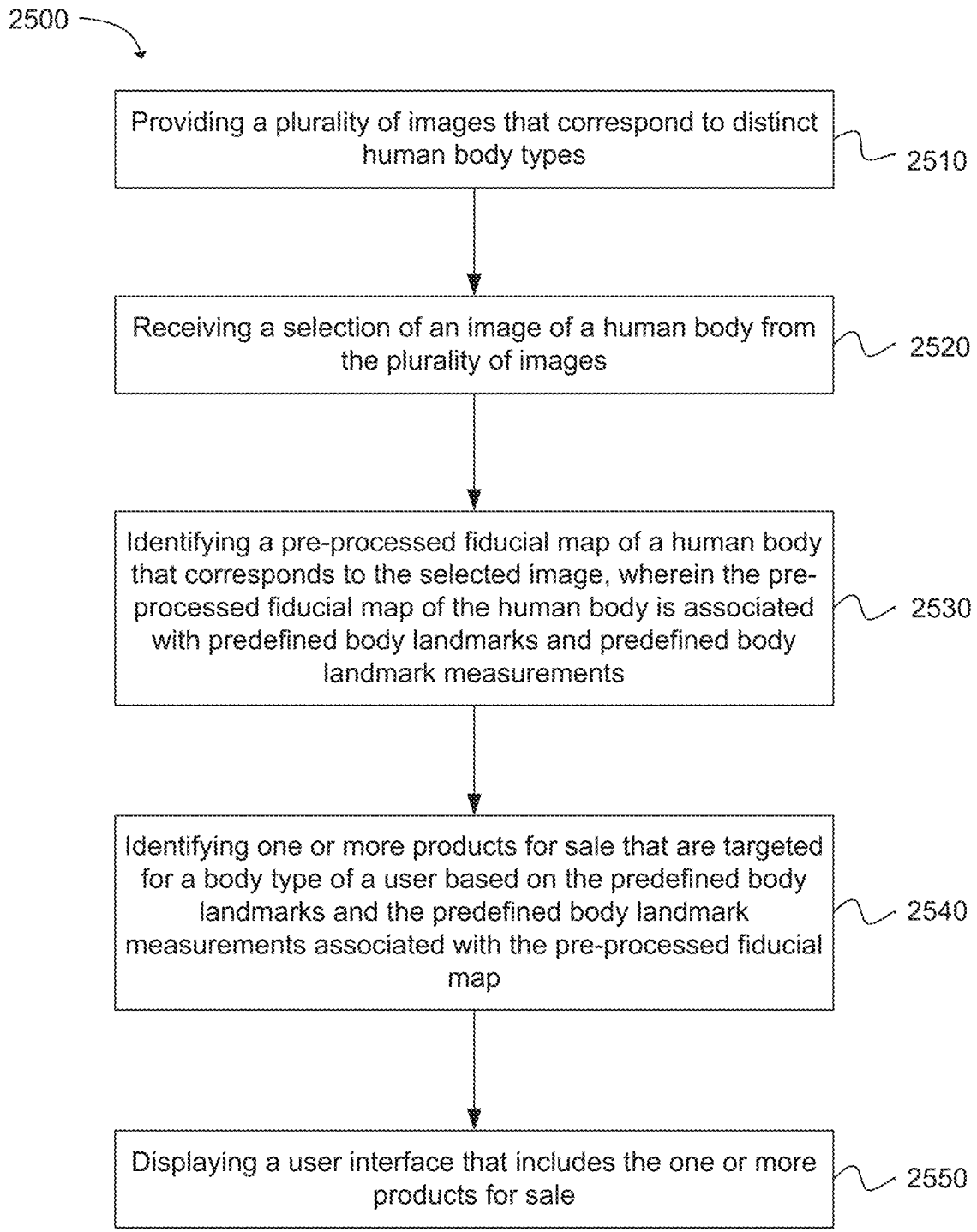
FIG. 25 is a flowchart of an example method for providing targeted products based on body type.

Another example provides a method 2500 for providing targeted products based on body type, as shown in the flow chart in FIG. 25. The method may be executed as instructions on a machine, where the instructions are included on at least one computer readable medium or one non-transitory machine readable storage medium. The method can include the operation of providing a plurality of images that correspond to distinct human body types, as in block 2510. The method can include the operation of receiving a selection of an image of a human body from the plurality of images, as in block 2520. The method can include the operation of identifying a pre-processed fiducial map of a human body that corresponds to the selected image, wherein the pre-processed fiducial map of the human body is associated with predefined body landmarks and predefined body landmark measurements, as in block 2530. The method can include the operation of identifying one or more products for sale that are targeted for a body type of a user based on the predefined body landmarks and the predefined body landmark measurements associated with the pre-processed fiducial map, as in block 2540. The method can include the operation of displaying a user interface that includes the one or more products for sale, as in block 2550.

Figure 26:
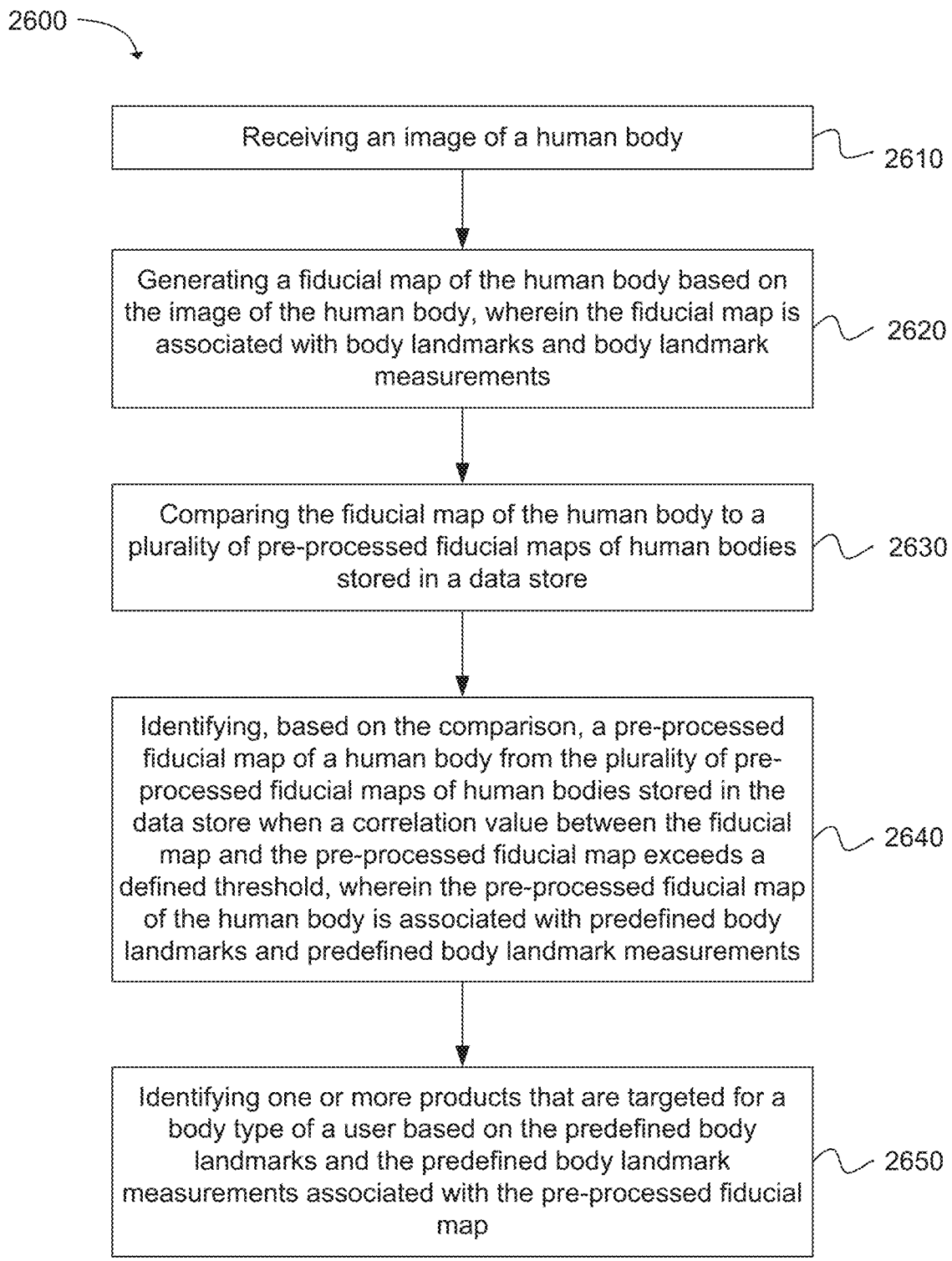
FIG. 26 is a flowchart of another example method for providing targeted products based on body type.

Another example provides a method 2600 for providing targeted products based on body type, as shown in the flow chart in FIG. 26. The method may be executed as instructions on a machine, where the instructions are included on at least one computer readable medium or one non-transitory machine readable storage medium. The method can include the operation of receiving an image of a human body, as in block 2610. The method can include the operation of generating a fiducial map of the human body based on the image of the human body, wherein the fiducial map is associated with body landmarks and body landmark measurements, as in block 2620. The method can include the operation of comparing the fiducial map of the human body to a plurality of pre-processed fiducial maps of human bodies stored in a data store, as in block 2630. The method can include the operation of identifying, based on the comparison, a pre-processed fiducial map of a human body from the plurality of pre-processed fiducial maps of human bodies stored in the data store when a correlation value between the fiducial map and the pre-processed fiducial map exceeds a defined threshold, wherein the pre-processed fiducial map of the human body is associated with predefined body landmarks and predefined body landmark measurements, as in block 2640. The method can include the operation of identifying one or more products that are targeted for a body type of a user based on the predefined body landmarks and the predefined body landmark measurements associated with the pre-processed fiducial map, as in block 2650.

Figure 27:
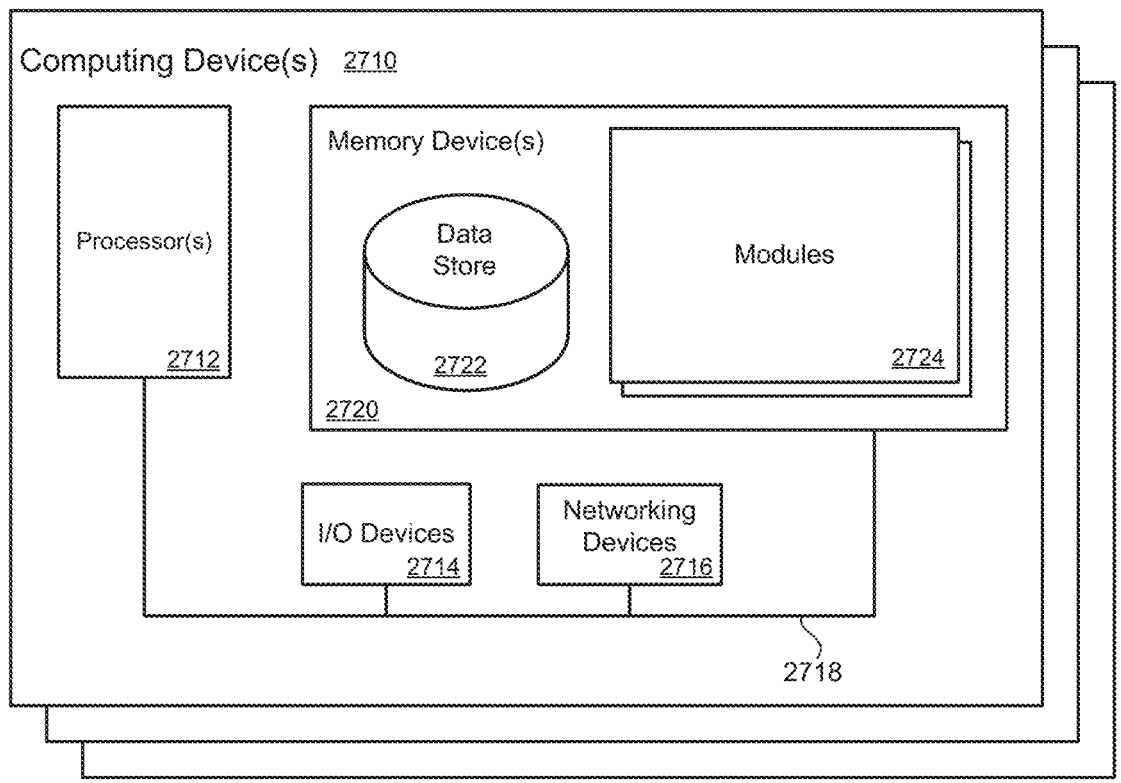
FIG. 27 is a block diagram that provides an example illustration of a computing device that may be employed in the present technology.

FIG. 27 illustrates a computing device 2710 on which modules of this technology may execute. A computing device 2710 is illustrated on which a high level example of the technology may be executed. The computing device 2710 may include one or more processors 2712 that are in communication with memory devices 2720. The computing device may include a local communication interface 2718 for the components in the computing device. For example, the local communication interface may be a local data bus and/or any related address or control busses as may be desired.

The memory device 2720 may contain modules 2724 that are executable by the processor(s) 2712 and data for the modules 2724. The modules 2724 may execute the functions described earlier. A data store 2722 may also be located in the memory device 2720 for storing data related to the modules 2724 and other applications along with an operating system that is executable by the processor(s) 2712.

Other applications may also be stored in the memory device 2720 and may be executable by the processor(s) 2712. Components or modules discussed in this description that may be implemented in the form of software using high programming level languages that are compiled, interpreted or executed using a hybrid of the methods.

The computing device may also have access to I/O (input/output) devices 2714 that are usable by the computing devices. An example of an I/O device is a display screen that is available to display output from the computing devices. Other known I/O device may be used with the computing device as desired. Networking devices 2716 and similar communication devices may be included in the computing device. The networking devices 2716 may be wired or wireless networking devices that connect to the internet, a LAN, WAN, or other computing network.

The components or modules that are shown as being stored in the memory device 2720 may be executed by the processor 2712. The term "executable" may mean a program file that is in a form that may be executed by a processor 2712. For example, a program in a higher level language may be compiled into machine code in a format that may be loaded into a random access portion of the memory device 2720 and executed by the processor 2712, or source code may be loaded by another executable program and interpreted to generate instructions in a random access portion of the memory to be executed by a processor. The executable program may be stored in any portion or component of the memory device 2720. For example, the memory device 2720 may be random access memory (RAM), read only memory (ROM), flash memory, a solid state drive, memory card, a hard drive, optical disk, floppy disk, magnetic tape, or any other memory components.

The processor 2712 may represent multiple processors and the memory 2720 may represent multiple memory units that operate in parallel to the processing circuits. This may provide parallel processing channels for the processes and data in the system. The local interface 2718 may be used as a network to facilitate communication between any of the multiple processors and multiple memories. The local interface 2718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system for generating measurements of a human body, comprising:
    an image capturing device configured to capture one or more images of the human body;
    a data store configured to store pre-processed fiducial maps of human bodies;
    one or more processors configured to:
        receive the one or more images of the human body from the image capturing device;
        identify body landmarks for the human body based on the one or more images;
        generate a fiducial map of the human body using the body landmarks and body landmark measurements, wherein the fiducial map corresponds to a 3D body model of the human body;
        compare the fiducial map of the human body to the pre-processed fiducial maps of human bodies stored in the data store;
        identify, based on the comparison, a plurality of pre-processed fiducial maps of human bodies when a correlation value between the fiducial map and the pre-processed fiducial map exceeds a defined threshold;
        generate a silhouette image of the human body based on the one or more images of the human body;
        compare the silhouette image of the human body to pre-processed silhouette images associated with the plurality of pre-processed fiducial maps of human bodies;
        identify, based on the comparison, one of the pre-processed silhouette images associated with one of the plurality of pre-processed fiducial maps when a correlation value between the silhouette image of the human body and the pre-processed silhouette images exceeds a defined threshold; and
        identify measurements of the human body based on a pre-processed 3D model in the data store associated with the one of the pre-processed silhouette images and the one of the plurality of pre-processed fiducial maps; and
    a user interface configured to receive the one or more images of the human body, and display the measurements of the human body.

2. The system of claim 1, wherein the one or more processors are further configured to:
    detect pixel locations of the body landmarks on the one or more images of the human body; and
    translate the pixel locations of the body landmarks to 3D coordinates; and
    use the 3D coordinates to generate the fiducial map of the human body that corresponds to the 3D body model of the human body.

3. The system of claim 1, wherein the one or more processors are further configured to:
    determine a type of pose associated with the human body based on the body landmarks;
    determine segmented curvatures associated with the human body based on the body landmarks; and
    generate the fiducial map of the human body based on the type of pose and the segmented curvatures.

4. The system of claim 1, wherein the one or more processors are configured to identify the pre-processed fiducial map of the human body as correlating with the fiducial map of the human body using one or more of: a statistical regression model, a machine learning model, principal component analysis, a neural network, an artificial intelligence model, or a nearest neighbor classifier.

5. The system of claim 1, wherein:
    the user interface is configured to display the silhouette image of the human body along with the pre-processed 3D model and the measurements.

6. At least one non-transitory machine readable storage medium having instructions embodied thereon for generating a three dimensional (3D) model of a human body and corresponding measurements, the instructions when executed by one or more processors perform the following:
    identifying one or more images of the human body;
    identifying body landmarks for the human body based on the one or more images;
    determining body landmark measurements associated with the body landmarks for the human body;
    generating a fiducial map of the human body using the body landmarks, the body landmark measurements, wherein the fiducial map corresponds to a 3D body model of the human body;
    comparing the fiducial map of the human body to a plurality of pre-processed fiducial maps of human bodies stored in a data store;
    identifying, based on the comparison, a pre-processed fiducial map of a human body from the plurality of pre-processed fiducial maps of human bodies stored in the data store when a correlation value between the fiducial map and the pre-processed fiducial map exceeds a defined threshold;
    generating a silhouette image of the human body based on the one or more images of the human body;

comparing the silhouette image of the human body to pre-processed silhouette images associated with the plurality of pre-processed fiducial maps of human bodies;

identifying, based on the comparison, a pre-processed silhouette image when a correlation value between the silhouette image of the human body and the pre-processed silhouette image exceeds a defined threshold; and generating the 3D model of the human body from the pre-processed fiducial map and the pre-processed silhouette image; and providing a user interface that displays the 3D model of the human body and the corresponding measurements.

7. The at least one non-transitory machine readable storage medium of claim 6, further comprising instructions when executed perform the following: receiving the one or more images of the human body from a computing device associated with the user, wherein the one or more images of the human body are captured using a camera and uploaded from the computing device.

8. The at least one non-transitory machine readable storage medium of claim 6, further comprising instructions when executed perform the following:

providing, via the user interface, a plurality of images that correspond to distinct human body types; and receiving, via the user interface, a selection of the one or more images of the human body from the plurality of images.

9. The at least one non-transitory machine readable storage medium of claim 6, further comprising instructions when executed perform the following:

detecting pixel locations of the body landmarks on the one or more images of the human body; and translating the pixel locations of the body landmarks to 3D coordinates to be used when generating the fiducial map of the human body that corresponds to the 3D body model of the human body.

10. The at least one non-transitory machine readable storage medium of claim 6, further comprising instructions when executed perform the following:

determining a type of pose associated with the human body based on the body landmarks;

determining segmented curvatures associated with the human body based on the body landmarks; and generating the fiducial map of the human body based on the type of pose and the segmented curvatures.

11. The at least one non-transitory machine readable storage medium of claim 6, further comprising instructions when executed perform the following: identifying the pre-processed fiducial map of the human body as correlating with the fiducial map of the human body using one or more of: a statistical regression model, a machine learning model, principal component analysis, a neural network, an artificial intelligence model, or a nearest neighbor classifier.

12. The at least one non-transitory machine readable storage medium of claim 6, further comprising instructions when executed perform the following: providing the user interface to include a history of 3D models of the human body and corresponding body information for the user over a period of time to enable the user to track a progress level.

13. The at least one non-transitory machine readable storage medium of claim 6, wherein the one or more images of the human body include depth information.

14. The at least one non-transitory machine readable storage medium of claim 6, wherein each pre-processed fiducial map in the plurality of pre-processed fiducial maps of human bodies stored in the data store has been previously processed for body landmarks and body landmark measurements.

15. A method for generating measurements of a human body, comprising:

identifying one or more images of the human body that include depth information;

generating a fiducial map of the human body based on the one or more images of the human body;

comparing the fiducial map of the human body to a plurality of pre-processed fiducial maps of human bodies stored in a data store;

identifying, based on the comparison, a pre-processed fiducial map of a human body from the plurality of pre-processed fiducial maps of human bodies stored in the data store when a correlation value between the fiducial map and the pre-processed fiducial map exceeds a defined threshold;

generating a silhouette image of the human body based on the one or more images of the human body;

comparing the silhouette image of the human body to pre-processed silhouette images associated with the plurality of pre-processed fiducial maps of human bodies;

identifying, based on the comparison, a pre-processed silhouette image when a correlation value between the silhouette image of the human body and the pre-processed silhouette image exceeds a defined threshold;

generating a 3D model of the human body from the pre-processed fiducial map and the pre-processed silhouette image;

generating measurements of the human body based on the 3D model; and displaying a user interface that includes the 3D model of the human body and the measurements.

16. The method of claim 15, further comprising:

identifying body landmarks for the human body based on the one or more images;

determining body landmark measurements associated with the body landmarks for the human body;

receiving user metadata for a user associated with the one or more images of the human body; and generating the fiducial map of the human body using the body landmarks, the body landmark measurements and the user metadata.

17. The method of claim 15, further comprising receiving the one or more images of the human body from a computing device associated with the user, wherein the one or more images of the human body are captured using a camera and uploaded from the computing device.

18. The method of claim 15, further comprising:

providing, via the user interface, a plurality of images that correspond to distinct human body types; and receiving, via the user interface, a selection of the one or more images of the human body from the plurality of images.

19. The method of claim 15, further comprising generating the 3D model of the human body for usage in one or more of: body scanning, health and wellness assessment, health and wellness tracking or electronic commerce.

* * * * *